United States Patent
Ghare et al.

(10) Patent No.: US 10,944,804 B1
(45) Date of Patent: Mar. 9, 2021

(54) FRAGMENTATION OF TIME-ASSOCIATED DATA STREAMS

(71) Applicant: Amazon Technologies, Inc., Seattle, WA (US)

(72) Inventors: Gaurav D. Ghare, Seattle, WA (US); Sayantan Chakravorty, Sammamish, WA (US); Mushegh Malkhasyan, Redmond, WA (US); Vijay Gopal Joshi, Bellevue, WA (US); Duc Viet Nguyen, Seattle, WA (US); Artem Kryvokrysenko, Seattle, WA (US); Mitchell Ross Loeppky, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 396 days.

(21) Appl. No.: 15/821,673

(22) Filed: Nov. 22, 2017

(51) Int. Cl.
  *H04L 29/06* (2006.01)
  *H04N 21/4402* (2011.01)
  *H04L 29/08* (2006.01)
  *H04L 12/26* (2006.01)

(52) U.S. Cl.
  CPC .......... *H04L 65/604* (2013.01); *H04L 43/106* (2013.01); *H04L 69/329* (2013.01); *H04N 21/4402* (2013.01)

(58) Field of Classification Search
  CPC ... H04L 65/604; H04L 43/106; H04L 69/329; H04N 21/4402
  See application file for complete search history.

(56) References Cited

U.S. PATENT DOCUMENTS

| | | | |
|---|---|---|---|
| 6,201,562 B1 * | 3/2001 | Lor | H04N 7/147 348/14.01 |
| 6,448,978 B1 * | 9/2002 | Salvador | H04L 67/22 709/204 |
| 7,908,389 B2 | 3/2011 | Zuckerman et al. | |
| 9,774,564 B2 | 9/2017 | Quan et al. | |
| 9,855,698 B2 | 1/2018 | Perez et al. | |
| 10,027,997 B2 | 7/2018 | Mutton | |
| 2002/0104022 A1 * | 8/2002 | Jorgenson | H04L 29/06 726/12 |

(Continued)

OTHER PUBLICATIONS

Edoardo Biagioni, Lecture Note of Data Networks, ICS 451, Oct. 11, 2010, http://www2.hawaii.edu/~esb/2010fall.ics451/oct11.html (Year: 2010).*

(Continued)

*Primary Examiner* — Wing F Chan
*Assistant Examiner* — Billy H Ng
(74) *Attorney, Agent, or Firm* — Thomas | Horstemeyer LLP

(57) ABSTRACT

Disclosed are various embodiments for fragmentation of time-associated streaming data. A producer application receives a stream of time-associated data. The producer application then generates a first fragment of the stream of time-associated data and assigns a first unique fragment identifier and a first timestamp to the first fragment. The producer application sends the first fragment via a network using an application-layer protocol to an endpoint. The producer application receives at least one acknowledgement for the first fragment from the endpoint via the network using the application-layer protocol.

20 Claims, 12 Drawing Sheets

(56) References Cited

U.S. PATENT DOCUMENTS

| | | |
|---|---|---|
| 2004/0189792 A1 | 9/2004 | Joon et al. |
| 2006/0002256 A1 | 1/2006 | Kamio |
| 2006/0256721 A1* | 11/2006 | Yarlagadda ....... H04L 29/06027 370/235 |
| 2006/0259625 A1* | 11/2006 | Landfeldt ......... H04L 29/12283 709/227 |
| 2008/0151881 A1* | 6/2008 | Liu ................. H04N 21/64322 370/389 |
| 2009/0080418 A1 | 3/2009 | Koide |
| 2009/0187300 A1 | 7/2009 | Everitt et al. |
| 2009/0323809 A1 | 12/2009 | Raveendran |
| 2010/0005485 A1 | 1/2010 | Tian et al. |
| 2010/0082635 A1 | 4/2010 | Elsner et al. |
| 2010/0232404 A1 | 9/2010 | Chen et al. |
| 2010/0235528 A1 | 9/2010 | Bocharov et al. |
| 2010/0318515 A1 | 12/2010 | Ramanathan et al. |
| 2011/0080940 A1 | 4/2011 | Bocharov et al. |
| 2011/0142156 A1 | 6/2011 | Haartsen |
| 2011/0219138 A1 | 9/2011 | Cho et al. |
| 2011/0238789 A1 | 9/2011 | Luby et al. |
| 2012/0224825 A1 | 9/2012 | Royall et al. |
| 2013/0117418 A1 | 5/2013 | Mutton et al. |
| 2013/0166625 A1 | 6/2013 | Swaminathan et al. |
| 2013/0182107 A1 | 7/2013 | Anderson |
| 2013/0229511 A1 | 9/2013 | Oostendorp et al. |
| 2013/0297877 A1 | 11/2013 | Dennis |
| 2013/0315253 A1 | 11/2013 | Hegland et al. |
| 2014/0006515 A1 | 1/2014 | Yeskel et al. |
| 2014/0012958 A1 | 1/2014 | Nooney et al. |
| 2014/0085480 A1 | 3/2014 | Saptharishi |
| 2014/0149558 A1 | 5/2014 | Quan et al. |
| 2014/0250212 A1 | 9/2014 | Karlsson et al. |
| 2015/0095955 A1 | 4/2015 | Singh et al. |
| 2015/0142752 A1 | 5/2015 | Chennamsetty et al. |
| 2015/0201207 A1 | 7/2015 | Yie et al. |
| 2015/0271225 A1 | 9/2015 | Mao et al. |
| 2015/0271302 A1 | 9/2015 | Luby et al. |
| 2015/0271571 A1 | 9/2015 | Laksono et al. |
| 2015/0277802 A1 | 10/2015 | Oikarinen et al. |
| 2015/0288732 A1 | 10/2015 | Phillips et al. |
| 2015/0288733 A1 | 10/2015 | Mao et al. |
| 2015/0312341 A1 | 10/2015 | Smith |
| 2015/0364158 A1 | 12/2015 | Gupte et al. |
| 2015/0381875 A1 | 12/2015 | Yang et al. |
| 2016/0132331 A1 | 5/2016 | Godard et al. |
| 2016/0173387 A1* | 6/2016 | Chandrayana .......... H04L 67/02 370/231 |
| 2016/0182971 A1 | 6/2016 | Ortiz et al. |
| 2016/0259888 A1 | 9/2016 | Liu et al. |
| 2016/0323909 A1 | 11/2016 | Lin et al. |
| 2016/0380967 A1 | 12/2016 | Moore et al. |
| 2017/0031778 A1 | 2/2017 | De Schrijver et al. |
| 2017/0103103 A1 | 4/2017 | Nixon et al. |
| 2017/0237964 A1 | 8/2017 | Mäenpää |
| 2018/0113577 A1 | 4/2018 | Burns et al. |
| 2018/0219976 A1* | 8/2018 | Decenzo ............. H04L 65/4084 |
| 2018/0278583 A1 | 9/2018 | Cela |
| 2018/0300557 A1 | 10/2018 | Rodenas et al. |
| 2018/0349736 A1 | 12/2018 | Bapat et al. |
| 2019/0006900 A1 | 1/2019 | Nakayama et al. |
| 2019/0102287 A1 | 4/2019 | Cayton et al. |
| 2019/0158555 A1 | 5/2019 | Lavoie et al. |
| 2019/0245856 A1* | 8/2019 | Irwan ................... H04L 9/0643 |
| 2019/0272724 A1 | 9/2019 | Greene et al. |
| 2019/0320315 A1 | 10/2019 | Kwon |
| 2019/0320467 A1 | 10/2019 | Freda et al. |

OTHER PUBLICATIONS

U.S. Appl. No. 15/821,693, filed Nov. 22, 2017, Non-Final Office Action dated Nov. 25, 2019.

U.S. Appl. No. 15/821,692, filed Nov. 22, 2017, Final Office Action dated Jan. 7, 2020.

U.S. Appl. No. 15/821,687, filed Nov. 22, 2017, Restriction/Election dated Jan. 13, 2020.

U.S. Appl. No. 15/821,692, filed Nov. 22, 2017, Non-Final Office Action dated Jun. 14, 2019.

U.S. Appl. No. 15/821,687, entitled "Replicating and Indexing Fragments of Time-Associated Data Streams," and filed Nov. 22, 2017.

U.S. Appl. No. 15/821,692, entitled "Consuming Fragments of Time-Associated Data Streams," and filed Nov. 22, 2017.

U.S. Appl. No. 15/821,693, entitled "Framework for Time-Associated Data Stream Storage, Processing, and Replication," and filed Nov. 22, 2017.

U.S. Appl. No. 15/281,687, filed Nov. 22, 2017, Non-final Office Action dated Mar. 9, 2020.

U.S. Appl. No. 15/821,693, filed Nov. 22, 2017, Notice of Allowance dated Mar. 9, 2020.

U.S. Appl. No. 15/821,692, filed Nov. 22, 2017, Non-Final Office Action dated Jul. 9, 2020.

U.S. Appl. No. 15/821,687, filed Nov. 22, 2017, Notice of Allowance dated Aug. 28, 2020.

* cited by examiner

FRAGMENTATION OF TIME-ASSOCIATED DATA STREAMS

BACKGROUND

Media streams, such as video and audio streams, may be sent over a network to multiple receiving clients. In a unicast-based system, individual copies of the stream are sent separately over the network to each client. By contrast, in a multicast-based system, a single copy of the stream may be sent to a multicast address, and the multicast-enabled network enables replication of the stream to clients within the multicast group. In some cases, a client may record or store the stream for later playback. In some scenarios, media streams may be sent using transmission control protocol (TCP) for reliability, at a cost of higher latency. In other scenarios, media streams may be sent using user datagram protocol (UDP) with lower latency, at a cost of potentially increased errors or dropouts.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to frameworks and approaches for handling time-associated data streams. Conventional media streaming frameworks enable media streams to be uploaded to relay servers in real-time, and the relay servers can forward the media streams to a number of clients for consumption. If a client joins after the streaming has begun, the client is limited to consuming the media stream at the present time, as the media stream is generated. In other words, the client is unable to consume the portion of the media stream that was generated before the client joins. Alternatively, a file corresponding to the entirety of the media may be uploaded to a server and downloaded by multiple clients at any time. However, such approaches are not well-suited to real-time media.

Various embodiments of the present disclosure introduce a framework for streaming time-associated data that relies upon fragmentation to persist portions of a stream in a data store concurrently with the stream being relayed to clients. Fragments of a stream are sent by a producer to an endpoint via a network using an application-layer protocol. The endpoint acknowledges receipt of the fragments to the producer, and the endpoint proceeds to store the fragments in a persistent data store. If clients have requested to receive the stream in real-time, the fragments may be forwarded to the clients before they are persisted. Once the fragments are persisted in the data store, the endpoint may acknowledge this to the producer.

The framework facilitates both real-time and delayed consumption of the stream. For example, a client may request and receive the stream in real-time, where the fragments are forwarded to the client as they are received by the endpoint. However, if the client has joined after the stream has started, the client may request to receive the stream beginning at an earlier point of time. The previously stored fragments may then be loaded from the data store and sent to the client. This framework may also be used to perform arbitrary processing on the stream fragments before or after they have been stored in the data store. In the following discussion, a general description of the system and its components is provided, followed by a discussion of the operation of the same.

Figure 1:
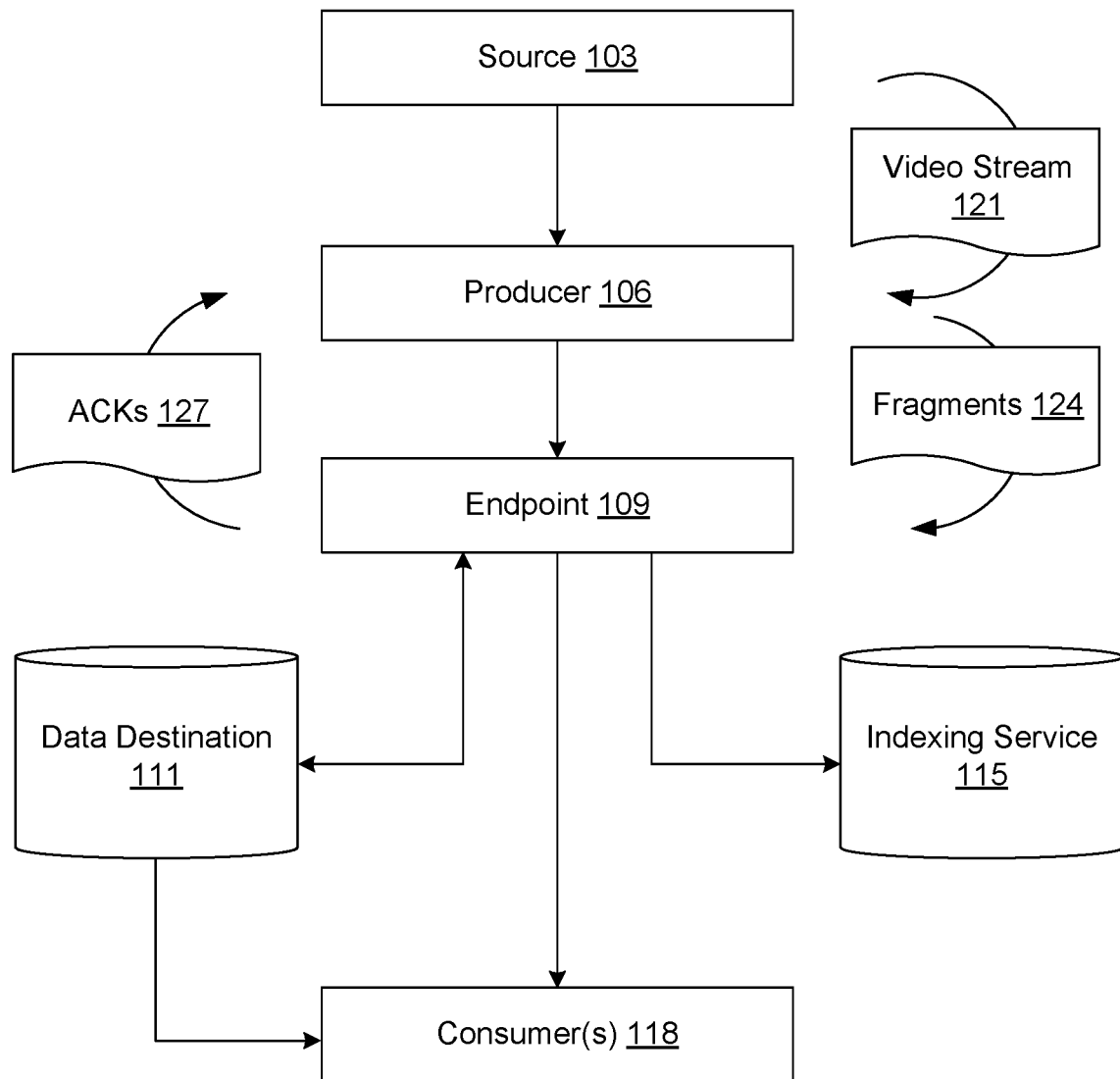
FIG. 1 is a drawing of an example framework according to various embodiments of the present disclosure

Turning now to FIG. 1, shown is a drawing of an example framework 100 according to various embodiments of the present disclosure. The framework 100 in this example includes a source 103, a producer 106, an endpoint 109, a data destination 111, an indexing service 115, and one or more consumers 118. The source 103 is a device, peripheral, or system that generates a time-associated data stream, such as a video stream 121. The source 103 sends the video stream 121 to a producer 106 in a conventional video stream format such as the Matroska multimedia container format (MKV), audio video interleaved (AVI), Moving Picture Experts Group (MPEG)-4 Part 14 (MP4), and others. Such video stream formats may comprise metadata and a sequence of video frames. In one embodiment, the source 103 and the producer 106 are in a single computing device.

The producer 106 receives the video stream 121 and divides the video stream 121 into fragments 124 of a specified time length or size. For example, the fragments 124 may be between two and ten seconds long. Thus, if the video stream 121 has a thirty frames per second frame rate, a fragment 124 could include between sixty and three hundred video frames. The producer 106 then sends the fragments 124 serially to an endpoint 109 via a network using an application-layer protocol. The fragment 124 may include a timestamp assigned by the producer 106.

The endpoint 109 receives the fragments 124 and returns acknowledgements 127 to the producer 106 via the network using the application-layer protocol. The endpoint 109 may acknowledge that data from a fragment 124 has begun to be received and/or that the data from the fragment 124 has completely being received. The endpoint 109 may also send non-acknowledgements to the producer 106 if a particular fragment 124 has been missed, contains an error, could not be stored in a data store, or otherwise could not be processed. The producer 106 may maintain the fragments 124 in a buffer and resend those that are not acknowledged.

The endpoint 109 may send the fragments 124 on to one or more consumers 118 so that the video stream 121 can be consumed or played in real-time. In addition, the endpoint 109 may send the fragments 124 to a data destination 111, which may correspond to a content distribution network, a processing engine, or a persistent data store. Upon persistence of the fragments 124 in the data destination 111, the endpoint 109 may send an acknowledgement 127 to the producer 106. The endpoint 109 may also index the fragments 124 based at least in part on fragment identifiers, producer 106 timestamps, endpoint 109 timestamps, tags assigned to the fragments 124, or other data. In addition to receiving the fragments 124 in real-time, the consumers 118 may receive previously generated and stored fragments 124 from the data destination 111 or fragments 124 stored in a buffer of the endpoint 109.

Figure 2:
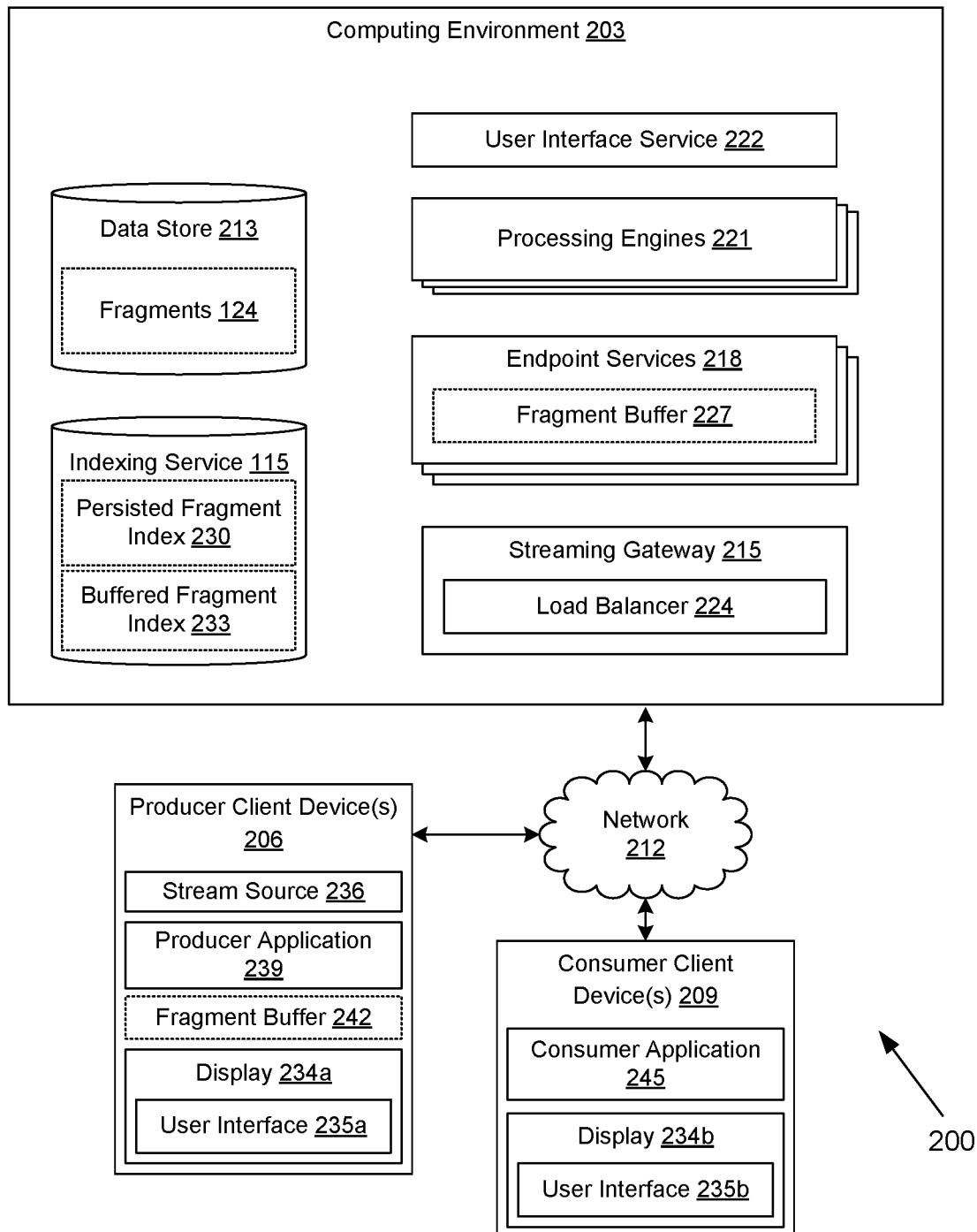
FIG. 2 is a schematic block diagram of a networked environment according to various embodiments of the present disclosure.

With reference to FIG. 2, shown is a networked environment 200 according to various embodiments. The networked environment 200 includes a computing environment 203, one or more producer client devices 206, and one or more consumer client devices 209, which are in data communication with each other via a network 212. The network 212 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks or computer banks or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data may be stored by a data store 213 and an indexing service 115 that are accessible to the computing environment 203. The data store 213 and the indexing service 115 may be representative of a plurality of data stores as can be appreciated. The data stored by the data store 213 and the indexing service 115, for example, may be associated with the operation of the various applications and/or functional entities described below.

The components executed on the computing environment 203, for example, include a streaming gateway 215, a plurality of endpoint services 218, a plurality of processing engines 221, a user interface service 222, and other applications, services, processes, systems, engines, or functionality not discussed in detail herein. The streaming gateway 215 is executed to receive requests from producer client devices 206 to send streams of time-associated data to the computing environment 203.

In this regard, the streaming gateway 215 may incorporate a load balancer 224 that can route the request to a particular one of the plurality of endpoint services 218 based at least in part on a variety of factors. Such factors may include load on the particular endpoint service 218, a network distance between the producer client device 206 and the particular endpoint service 218, a load on a network connection between the producer client device 206 and the particular endpoint service 218, and so on. If a connection between the producer client device 206 and the endpoint service 218 is dropped, in one scenario, the streaming gateway 215 may route a subsequent connection from the producer client device 206 to the same endpoint service 218. In another scenario, the streaming gateway 215 may route the subsequent connection from the producer client device 206 to a different endpoint service 218 based at least in part on reevaluation of the pertinent factors. In other embodiments, the streaming gateway 215 may automatically route fragments 124 to different endpoint services 218 to achieve load balancing.

Additionally, the streaming gateway 215 may receive requests from consumer client devices 209 to consume streams of time-associated data. If the request is for stream fragments 124 already persisted in the data store 213, the streaming gateway 215 may load the fragments 124 from the data store 213 and send the fragments to the consumer client device 209 via the network 212. Alternatively, the streaming gateway 215 may route the request to an endpoint service 218 based at least in part on load or other factors in order for the endpoint service 218 to satisfy the request.

If the request is for stream fragments 124 of a live or real-time stream, the streaming gateway 215 may route the request to the particular endpoint service 218 that is currently receiving streaming data from the corresponding producer client device 206. Where the request may be satisfied from previously generated fragments, the streaming gateway 215 may obtain fragments 124 from multiple endpoint services 218 if they are currently buffered in memory by the respective endpoint services 218. The endpoint service 218 can then send the live fragments 124 in real-time as they are received.

The endpoint services 218 are executed to receive streams of time-associated data from producer client devices 206, generate unique fragment identifiers, store the fragments of the streams via the data store 213, index the fragments 214 via the indexing service 115, cause processing to take place on the fragments 124 via the processing engines 221, and to route fragments 124 to consumer client devices 209 that have requested to receive the fragments 124 in real-time. An endpoint service 218 may support multiple simultaneous streams from multiple producer devices 206, and an endpoint service 218 may store multiple fragments 124 for a given stream in a fragment buffer 227, before or after the fragments 124 are persisted by the data store 213. It is noted that the each of the endpoint services 218 may be executed on separate computing devices or by different virtual machine instances in the computing environment 203. The endpoint services 218 may be hosted in diverse geographic locations and in different availability zones, where the availability zones are configured with independent power connections, network connections, etc., so that a failure of one availability zone will not impact another availability zone.

The processing engines 221 are executed to perform processing on fragments 124 before or after they are stored by the data store 213. A variety of different types of processing may be performed, depending on the type of data being streamed. For example, regarding video data, the processing may include motion detection, person or face detection, entity recognition, recognizing a defect on a product, transcoding the video data to a different format or compression, and so forth. The processing may include aggregating fragments 124 from multiple streams together, e.g., to provide a single stream that is smaller or that has higher resolution. When the endpoint service 218 processes a fragment 124 via the processing engine 221, the processing engine 221 may provide a confirmation or acknowledgment that the fragment 124 has been processed.

The user interface service 222 may be executed to provide information about streams and management control of streams being processed via the computing environment 203. To this end, the user interface service 222 may generate network pages, such as web pages, mobile application data, or other forms of network content. In addition, the user interface service 222 may allow for the viewing of streams that are stored or being processed through the computing environment 203. In one embodiment, the user interface service 222 may act as a consumer and then transpackage the stream from one format to another for consumption on a client device, such as through a web browser. For example, the user interface service 222 may transpackage the fragments 124 of a video stream from MKV to MP4.

The data store 213 may correspond, for example, to an eventually consistent data store that is configured to store data objects in buckets associated with metadata. In this case, the data store 213 is used to store the fragments 124. In different scenarios, fragments 124 may be aggregated into fewer fragments 124 or split into smaller fragments 124 in order to provide efficient storage and retrieval with the data store 213. For example, the data store 213 may be optimized for the storage of larger data objects, and smaller fragments 124 may be combined for greater efficiency. The fragments 124 may be stored in and retrieved from the data store 213 on the basis of a unique fragment identifier. When the endpoint service 218 stores a fragment 124 in the data store 213, the data store 213 may provide a confirmation or acknowledgment that the fragment 124 has been persisted in the data store 213.

In some embodiments, different types of data stores 213 may be available. Some data stores 213 may provide storage and retrieval at a relatively high speed and at a relatively high cost. Other data stores 213 may be geared more towards long-term archival, where storage may be relatively inexpensive, but retrieval may be slow or associated with a high cost.

The indexing service 115 may correspond to a database management system that is relatively fast for indexing purposes. The indexing service 115 may store a persisted fragment index 230, a buffered fragment index 233, among other data. The persisted fragment index 230 may in particular allow indexing and retrieval of the fragments 124 from the data store 213 when the fragment unique identifier is not known initially. For example, the persisted fragment index 230 may index the fragments 124 based on unique fragment identifier, producer-generated timestamps, endpoint-generated timestamps, content tags, and/or other data. In one scenario, the persisted fragment index 230 may obtain a start time and/or an end time and produce all fragment identifiers for a stream that are between the start time and the end time. The buffered fragment index 233 may indicate which fragments 124 are currently in fragment buffers 227 of a memory of an endpoint service 218. Like the persisted fragment index 230, the buffered fragment index 233 may be indexed based on unique fragment identifier, producer-generated timestamps, endpoint-generated timestamps, content tags, and/or other data.

The producer client device 206 and the consumer client device 209 are representative of a plurality of client devices that may be coupled to the network 212. The producer client device 206 and the consumer client device 209 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, smartwatches, head mounted displays, voice interface devices, or other devices. The producer client device 206 and the consumer client device 209 may each include a respective display 234a, 234b comprising, for example, one or more devices such as liquid crystal display (LCD) displays, gas plasma-based flat panel displays, organic light emitting diode (OLED) displays, electrophoretic ink (E ink) displays, LCD projectors, or other types of display devices, etc. A respective user interface 235a, 235b may be rendered on the respective displays 234.

The producer client device 206 may include a stream source 236 and may be configured to execute various applications such as a producer application 239 and/or other applications. The stream source 236 may comprise a video camera, a microphone, an application or peripheral that generates time-associated data, and/or other sources of time-associated data. The producer application 239 is executed to receive the data stream from the stream source 236 and to send the stream to the computing environment 203. To this end, the producer application 239 may initially connect to the streaming gateway 215 and then be redirected by the load balancer 224 to a particular endpoint service 218. The producer application 239 divides the stream into fragments 124 and maintains a set of the fragments 124 in a fragment buffer 242 until the producer application 239 receives confirmation from the endpoint service 218 that each fragment 124 has been persisted. For example, the fragment buffer 242 may hold up to 180 seconds of the stream. The producer application 239 may resend particular fragments 124 to the endpoint service 218 as necessary.

In some cases, the producer application 239 may observe backpressure in uploading fragments 124 if there is a delay in persisting fragments 124 in the data store 213, processing the fragments 124 via the processing engines 221, or in adding the fragments 124 to the index via the indexing service 115. In such a scenario, the producer application 239 may receive acknowledgements that the fragments 124 are received but non-acknowledgments or other error indications or a lack of acknowledgment that the fragments 124 have been persisted by the data store 213 or processed by a processing engine 221. In such situations, the producer application 239 may decide to either back off and wait until receiving acknowledgments that the fragments 124 have been persisted or processed, or to continue to send new fragments 124 if the producer prefers to drop older data rather than wait before sending new data. The latter case may be preferable if sending fresh data to continuous consumers is of greater importance than persisting older data.

The consumer client device 209 may be configured to execute various applications such as a consumer application 245 and/or other applications. The consumer application 245 is executed to connect to the streaming gateway 215 and obtain fragments 124 of a stream of time-associated data. The consumer application 245 may obtain fragments 124 generated in real-time by the producer application 239 or fragments 124 that are persisted in the data store 213 or held in a fragment buffer 227 of one or more endpoint services 218. Upon obtaining the fragments 124, the consumer application 245 may render the stream of time-associated data via one or more output devices. For instance, the consumer application 245 may render video data on a display or audio data via a speaker. The consumer client device 209 may be configured to execute applications beyond the consumer application 245 such as, for example, web browsing applications, email applications, social networking applications, word processors, spreadsheets, and/or other applications.

Figure 3:
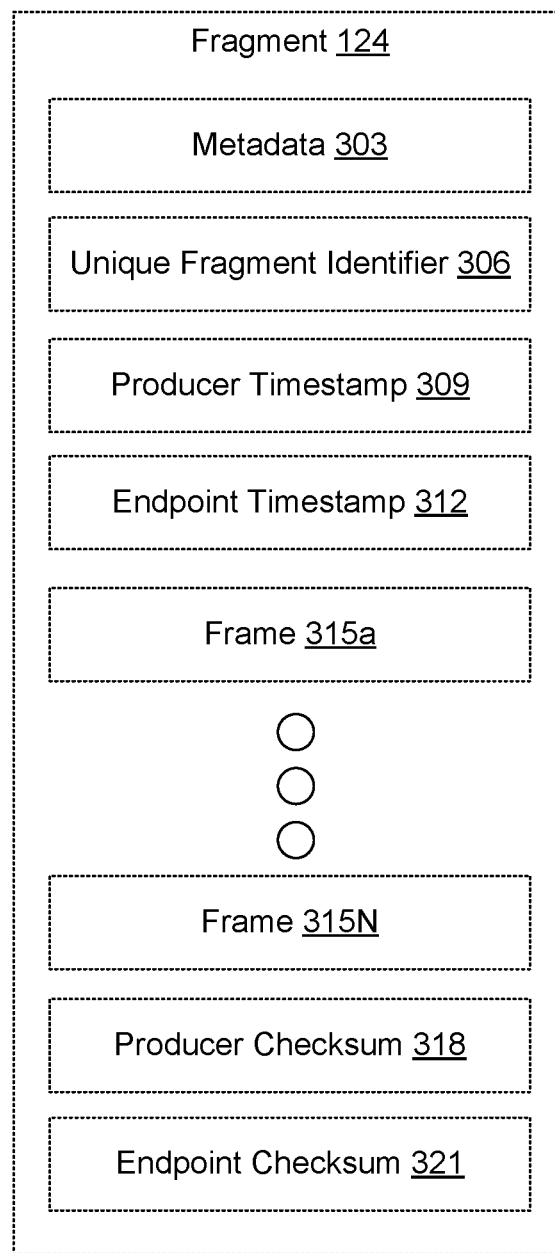
FIG. 3 is a diagram depicting an example fragment according to one embodiment of the present disclosure.

Moving on to FIG. 3, shown is a diagram depicting an example fragment 124 according to one embodiment of the present disclosure. The fragment 124 includes metadata 303, a unique fragment identifier 306, a producer timestamp 309, an endpoint timestamp 312, a plurality of frames 315a . . . 315N, a producer checksum 318, and an endpoint checksum 321, potentially among other data. The metadata 303 can include media-specific metadata that relates to the specific media streaming file format (e.g., MKV, AVI, etc.). The unique fragment identifier 306 uniquely identifies the particular fragment 124 out of all other fragments 124. The unique fragment identifier 306 may include a stream-specific component and/or a customer-specific component, which may be explicitly included within the unique fragment identifier 306 in the fragment 124, or which may be available from context.

The fragment 124 may include one or more timestamps, such as a producer timestamp 309 generated and assigned by the producer application 239 and an endpoint timestamp 312 generated and assigned by the endpoint service 218. The timestamps may be with respect to actual time (e.g., in universal coordinated time (UTC) or in a time zone specific to the producer application 239 or the endpoint service 218) or may be relative to the beginning or end of the particular stream. For example, the producer application 239 may assign the producer timestamp 309 when first sending a fragment 124, while the endpoint service 218 may assign the endpoint timestamp 218 when beginning to receive the fragment 124, when receipt of the fragment 124 is completed, or when persistence of the fragment 124 in the data store 213 is completed.

The frames 315 may correspond to video frames, audio frames, and other logical divisions of time-associated data, where each frame 315 may be associated with a timecode, which may be relative or absolute. The frames 315 may be selected to be included in the fragment 124 based at least in part on a logical boundary. For example, for video frames, the first frame 315a may be selected to be an independent frame or key frame (e.g., an I-frame under MPEG) so that it can be decoded without having data from a previous fragment 124.

The producer checksum 318 and the endpoint checksum 321 may include optional checksums generated by the producer application 239 and/or the endpoint service 218, respectively, to verify the integrity of the fragment 124. The producer checksum 318 may be attached by the producer application 239 to help verify transmission between the producer application 239 and the endpoint service 218. The endpoint checksum 321 may be internally assigned by the endpoint service 218 to verify integrity or correctness as data is moved, stored, or processed between different parts of the computing environment 203.

Figure 4:
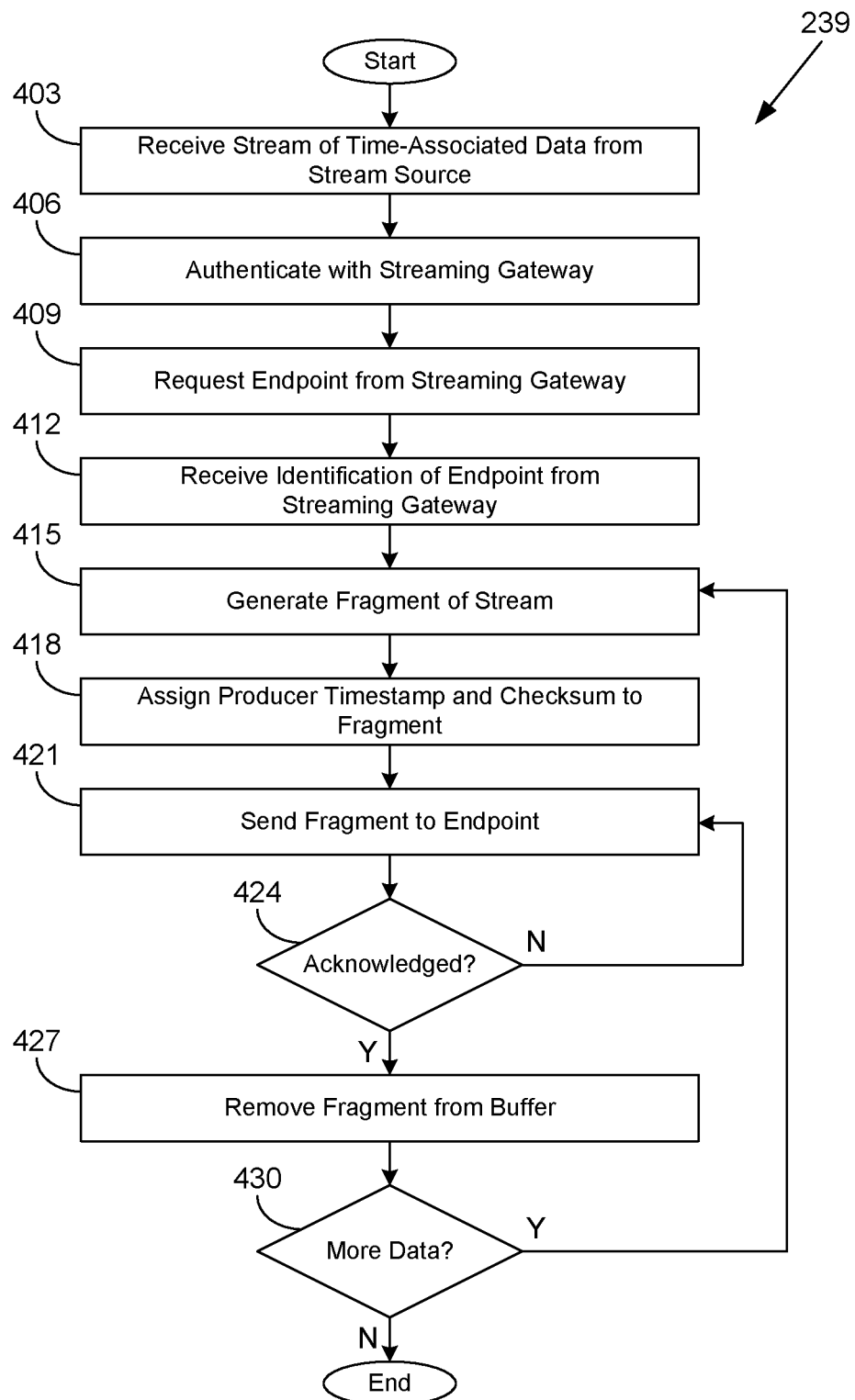
FIG. 4 is a flowchart illustrating one example of functionality implemented as portions of a producer application executed in a producer computing device in the networked environment of FIG. 2 according to various embodiments of the present disclosure.

Referring next to FIG. 4, shown is a flowchart that provides one example of the operation of a portion of the producer application 239 according to various embodiments. It is understood that the flowchart of FIG. 4 provides merely an example of the many different types of functional arrangements that may be employed to implement the operation of the portion of the producer application 239 as described herein. As an alternative, the flowchart of FIG. 4 may be viewed as depicting an example of elements of a method implemented in the producer client device 206 (FIG. 2) according to one or more embodiments.

Beginning with box 403, the producer application 239 receives a stream of time-associated data from a stream source 236 (FIG. 2). In box 406, the producer application 239 authenticates with the streaming gateway 215 (FIG. 2) via the network 212 (FIG. 2). For example, the producer application 239 may supply a username, password, key, or other security credential to the streaming gateway 215.

In box 409, the producer application 239 requests an endpoint service 218 (FIG. 2) from the streaming gateway 215. In box 412, the producer application 239 receives an identification of a particular one of the endpoint services 218 via the network 212 form the streaming gateway 215. For example, the producer application 239 may receive a network address such as an internet protocol (IP) address for the endpoint service 218.

In box 415, the producer application 239 generates or begins generating a fragment 124 of the stream, where the fragment 124 is stored temporarily in the fragment buffer 242 (FIG. 2). For example, the fragment 124 may be generated to include two to ten seconds of the time-associated data from the stream. In box 418, the producer application 239 assigns a producer timestamp 312 (FIG. 3) to the fragment 124 and may also optionally assign a producer checksum 318 over the fragment 124 or portions of the fragment 124.

In box 421, the producer application 239 sends or begins sending the fragment 124 to the endpoint service 218 via the network 212 using an application-layer protocol. For example, the producer application 239 may send the fragment 124 via a transmission control protocol (TCP)-based protocol such as hypertext transfer protocol (HTTP), or a user datagram protocol (UDP)-based protocol such as web real-time communication (WebRTC).

Although the application-layer protocol may be an automatic repeat request (ARQ)-based protocol for reliable delivery, such protocols may not account for failures within the computing environment 203 or encoding errors within a fragment 124. As such, the endpoint service 218 may be configured to acknowledge the fragment 124 and/or send non-acknowledgements if errors are detected. In particular, the endpoint service 218 may send a first acknowledgement when data from the fragment 124 is beginning to be received, a second acknowledgment when the data from the fragment 124 has completely been received, and a third acknowledgement when the fragment 124 has been persisted a data store (e.g., the data store 213 (FIG. 2)). The endpoint service 218 may send a non-acknowledgement if an error is detected or a gap in fragments 124 is detected.

In box 424, the producer application 239 determines whether an expected acknowledgment (or acknowledgements) have been received from the endpoint service 218. The acknowledgements may identify the fragments 124 by the producer timestamp 309. If not, or if a non-acknowledgement or indication of error has been received from the endpoint service 218, the producer application 239 returns to box 421 and retries sending the fragment 124 from the fragment buffer 242 to the endpoint service 218. This retrying may be attempted one or more times up to a predefined quantity. In some cases, the producer application 239 may disconnect from the endpoint service 218 and connect to another endpoint service 218. Also, in some scenarios, upon detecting network congestion or problems, the producer application 239 may be configured to adjust parameters of the fragments 124, such as compression level, resolution, frames per second, and so on, to reduce the data size of the fragments 124. The producer application 239 may configure the stream source 236 to implement the change, or the producer application 239 may be configured to transcode the stream.

If the fragment 124 has been acknowledged, and in some cases specifically if it has been persisted in the data store 213, the producer application 239 removes the fragment 124 from the fragment buffer 242 in box 427. In box 430, the producer application 239 determines whether there is more data from the stream to be sent. If there is more data to be sent, the producer application 239 can return to box 415 and generate another fragment 124 of the stream. Otherwise, the producer application 239 can close the connection, and the operation of the producer application 239 ends. It is noted that portions of the producer application 239 may be executed in parallel or pipelined. For instance, the producer application 239 may be sending multiple fragments 124 simultaneously, particularly if there is network congestion which hinders a fragment 124 from being received or acknowledged.

Figure 5:
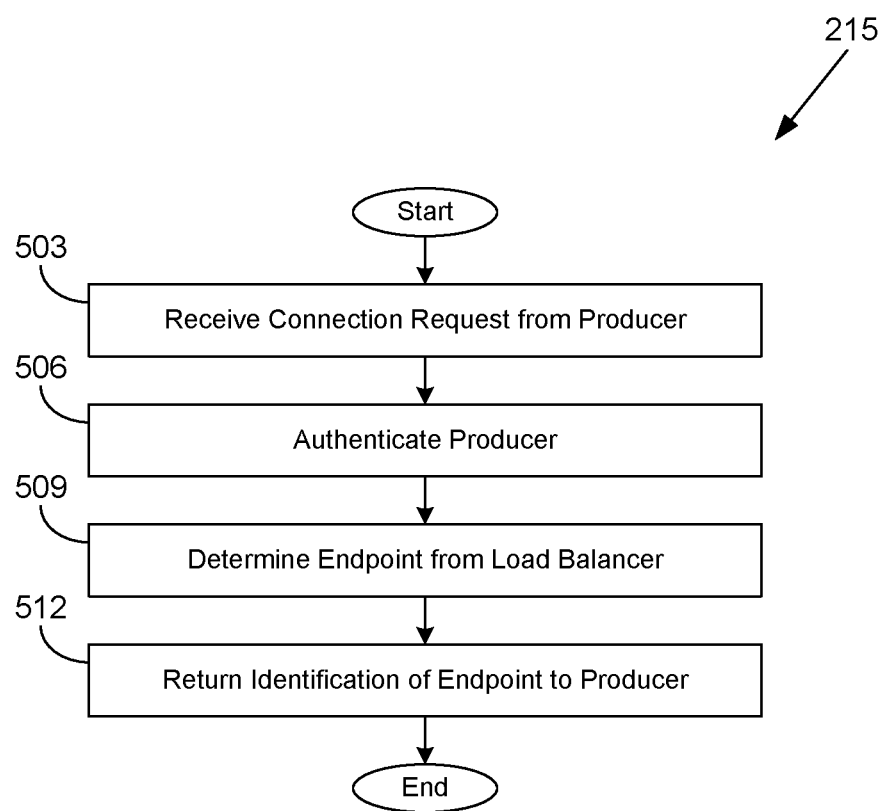
FIG. 5 is a flowchart illustrating one example of functionality implemented as portions of streaming gateway executed in a computing environment in the networked environment of FIG. 2 according to various embodiments of the present disclosure.

Turning now to FIG. 5, shown is a flowchart that provides one example of the operation of a portion of the streaming gateway 215 according to various embodiments. It is understood that the flowchart of FIG. 5 provides merely an example of the many different types of functional arrangements that may be employed to implement the operation of the portion of the streaming gateway 215 as described herein. As an alternative, the flowchart of FIG. 5 may be viewed as depicting an example of elements of a method implemented in the computing environment 203 (FIG. 2) according to one or more embodiments.

Beginning with box 503, the streaming gateway 215 receives a connection request from a producer application 239 (FIG. 2) via the network 212 (FIG. 2). In box 506, the streaming gateway 215 authenticates the producer application 239 based at least in part on security credentials supplied by the producer application 239 (e.g., username, password, key, token, etc.). In box 509, the streaming gateway 215 determines a particular endpoint service 218 (FIG. 2) from the plurality of endpoint services 218 according to the load balancer 224 (FIG. 2).

In box 512, the streaming gateway 215 returns an identification of the endpoint service 218 to the producer application 239. For example, the streaming gateway 215 may provide the network address of the endpoint service 218. In other embodiments, the streaming gateway 215 may act as a proxy for the selected endpoint service 218 to the producer application 239. Thereafter, the operation of the portion of the streaming gateway 215 ends.

Figure 6:
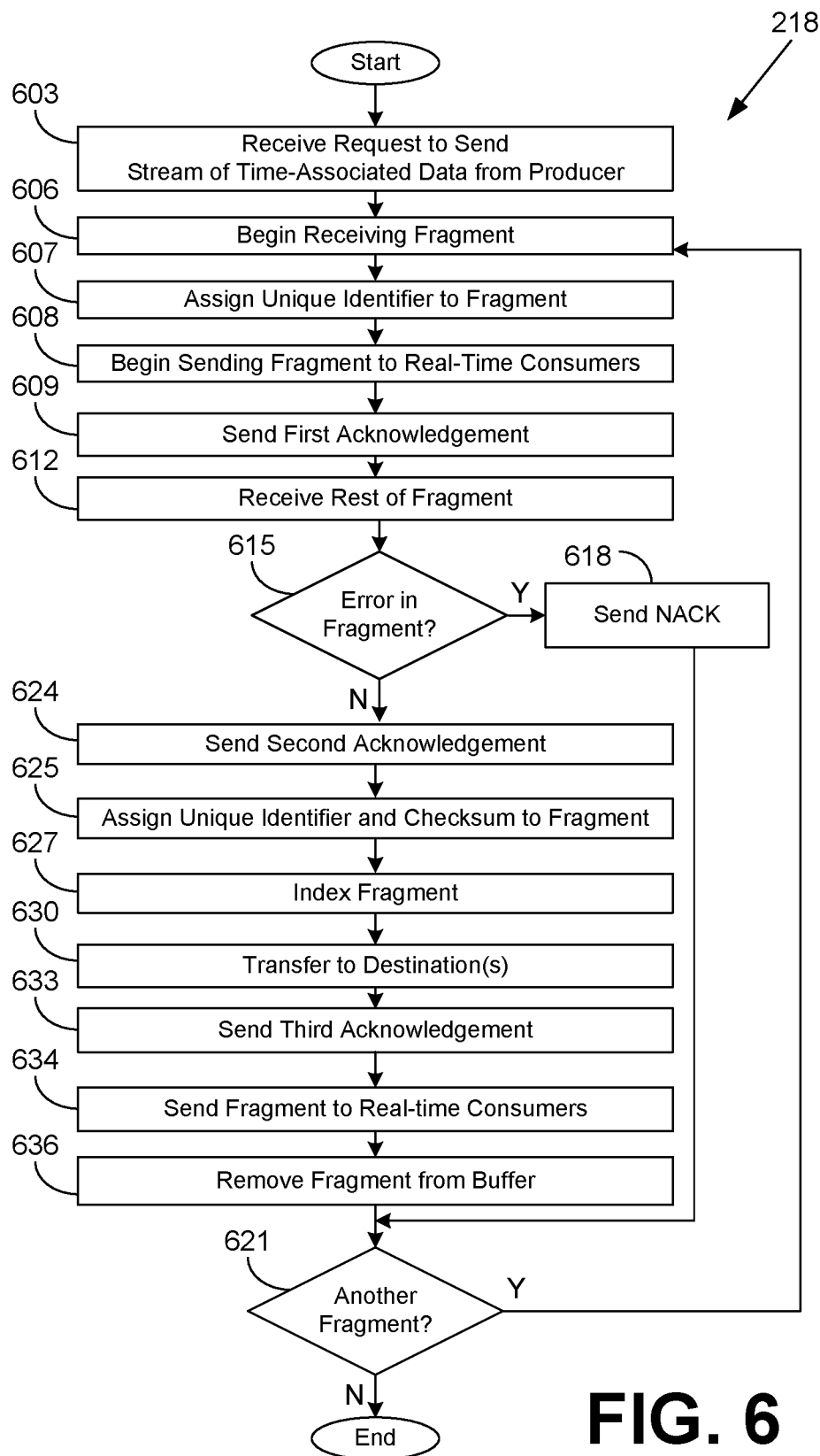
FIG. 6 is a flowchart illustrating one example of functionality implemented as portions of an endpoint service executed in a computing environment in the networked environment of FIG. 2 according to various embodiments of the present disclosure.

Continuing to FIG. 6, shown is a flowchart that provides one example of the operation of a portion of the endpoint service 218 according to various embodiments. It is understood that the flowchart of FIG. 6 provides merely an example of the many different types of functional arrangements that may be employed to implement the operation of the portion of the endpoint service 218 as described herein. As an alternative, the flowchart of FIG. 6 may be viewed as depicting an example of elements of a method implemented in the computing environment 203 (FIG. 2) according to one or more embodiments.

Beginning with box 603, the endpoint service 218 receives a request to send a stream of time-associated data from a producer application 239 (FIG. 2) via the network 212 (FIG. 2). In box 606, the endpoint service 218 begins receiving a fragment 124 (FIG. 2) of the stream via the network 212 using an application-layer protocol, such as HTTP or WebRTC. In box 607, the endpoint service 218 generates a unique fragment identifier 306 (FIG. 3) for the fragment 124. The unique fragment identifiers 306 may be increasing numbers to make it easier for consumers to track their position in the stream. For efficiency, the endpoint service 218 may reserves a few numbers at a time so endpoint service 218 may not have to coordinate with other hosts to guarantee uniqueness of fragment numbers for each fragment 124 it receives as part of a request.

In box 608, the endpoint service 218 may begin sending the fragment 124 to one or more real-time consumers (i.e., instances of consumer applications 245) via the network 212 even before the entirety of the fragment 124 is received. In box 609, the endpoint service 218 sends a first acknowledgment to the producer application 239 over the network 212 that the data from the fragment 124 has begun to be received. The acknowledgment may contain the producer timestamp 309 (FIG. 3) of the fragment 124 and the unique fragment identifier 306.

In box 612, the endpoint service 218 receives the rest of the data in the fragment 124. In box 615, the endpoint service 218 determines whether there is an error in the fragment 124. For example, the endpoint service 218 may perform a verification procedure to confirm that the data is encoded correctly, such as validating the producer checksum 318 (FIG. 3) set by the producer application 239. If the endpoint service 218 determines that there is an error in the fragment 124, the endpoint service 218 may send a non-acknowledgement to the producer application 239 via the network 212 in box 618. The endpoint service 218 then may determine whether another fragment 124 is to be received in box 621. If another fragment 124 is to be received, the endpoint service 218 returns to box 606 and begins receiving the fragment 124. Otherwise, the operation of the portion of the endpoint service 218 ends.

If there is not an error in the fragment 124, the endpoint service 218 continues from box 615 to box 624 and sends a second acknowledgment to the producer application 239 indicating that the data from the fragment 124 has completely been received. The fragment 124 may be buffered in memory of the endpoint service 218 in the fragment buffer 227 (FIG. 2).

In box 625, the endpoint service 218 may optionally compute an endpoint checksum 321 (FIG. 3) for the fragment 124. In box 627, the endpoint service 218 indexes the fragment 124 via the indexing service 115 (FIG. 2), potentially by an endpoint timestamp 312 (FIG. 3) generated by the endpoint service 218. In box 630, the endpoint service 218 transfers the fragment 124 to one or more destinations.

This may involve storing the fragment 124 with the data store 213 (FIG. 2). In some cases, the fragment 124 may be split into multiple portions before being stored, or multiple fragments 124 may be aggregated into fewer fragments 124 before being stored. The endpoint service 218 will then receive a status from the data store 213 indicating whether the fragment 124 has been persisted. Additionally, or alternatively, the endpoint service 218 may cause the fragment 124 to be processed by one or more particular processing engines 221 (FIG. 2), potentially before or after storing the fragment 124 via the data store 213. In some cases, the processed fragment 124 may be stored in lieu of the original fragment 124. In other cases, the output of the processing may be that the fragment 124 should not be stored, or that the fragment 124 should be aggregated with one or more other fragments 124.

If the fragment 124 has been persisted or processed, the endpoint service 218 moves to box 633 and sends a third acknowledgment to the producer application 239 indicating that the fragment 124 has been persisted in a data store 213 or processed by a processing engine 221. In box 634, the endpoint service 218 may send the fragment 124 to one or more real-time consumers (i.e., instances of consumer applications 245) via the network 212. In box 636, the endpoint service 218 may remove the fragment 124 from the fragment buffer 227. In box 621, the endpoint service 218 determines whether another fragment 124 is to be received. If another fragment 124 is to be received, the endpoint service 218 returns to box 606 and begins receiving another fragment 124. Otherwise, the operation of the portion of the endpoint service 218 ends.

Figure 7:
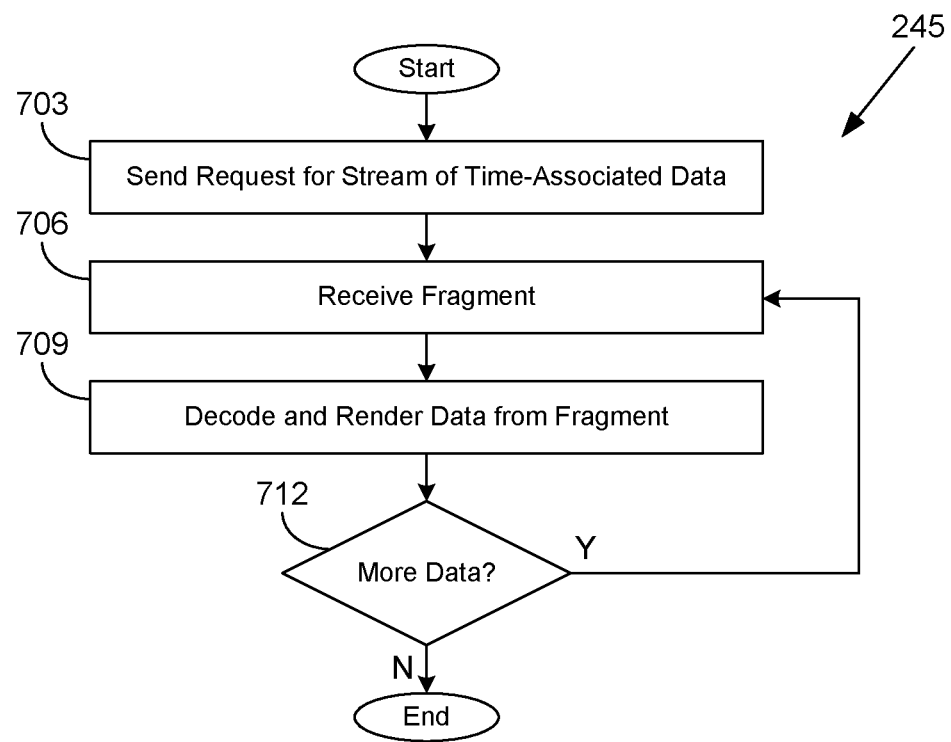
FIG. 7 is a flowchart illustrating one example of functionality implemented as portions of a consumer application executed in a consumer computing device in the networked environment of FIG. 2 according to various embodiments of the present disclosure.

Referring next to FIG. 7, shown is a flowchart that provides one example of the operation of a portion of the consumer application 245 according to various embodiments. It is understood that the flowchart of FIG. 7 provides merely an example of the many different types of functional arrangements that may be employed to implement the operation of the portion of the consumer application 245 as described herein. As an alternative, the flowchart of FIG. 7 may be viewed as depicting an example of elements of a method implemented in the consumer client device 209 (FIG. 2) according to one or more embodiments.

Beginning with box 703, the consumer application 245 sends a request to receive a stream of time-associated data to the streaming gateway 215 (FIG. 2) over the network 212 (FIG. 2). If the request is for a live, real-time stream, the request may not specify a start time. Alternatively, the request may specify a start time and/or and end time for the stream. In some cases, the consumer application 245 may have a list of multiple unique fragment identifiers 306 and may request specific fragments 124 using the unique fragment identifiers 306. Such a listing may be sent to the consumer application 245 in response to the query. In some cases, the listing may be divided into subsets and sent to the consumer application 245 one subset at a time.

In box 706, the consumer application 245 receives a fragment 124 (FIG. 2) of the stream from the streaming gateway 215. Alternatively, the consumer application 245 may be directed to a specific endpoint service 218 (FIG. 2) at a specified network address to receive the fragments 124. In some cases, the streaming gateway 215 may function as a proxy for the endpoint services 218.

In box 709, the consumer application 245 decodes and renders the data from the fragment 124. For example, the consumer application 245 may obtain the frames 315 from the fragment 124 and pass them to an audio or video decoder for rendering via an output device of the consumer client device 209. The consumer application 245 may maintain a buffer to counteract network effects, such as jitter.

In box 712, the consumer application 245 determines whether more data is to be received from the stream. If more data is to be received, the consumer application 245 returns to box 706 and begins receiving another fragment from the streaming gateway 215. In some cases, the endpoint service 218 may indicate that one or more fragments 124 in the stream will be skipped. Otherwise, the operation of the portion of the consumer application 245 ends. It is noted that in some cases the consumer application 245 may receive multiple fragments 124 in parallel, or the consumer application 245 may receive fragments 124 at a rate that is faster than the data rate of the stream. Such situations may occur when the consumer application 245 is requesting a non-live stream or is catching up after failure to receive data via the network 212.

Figure 8A:
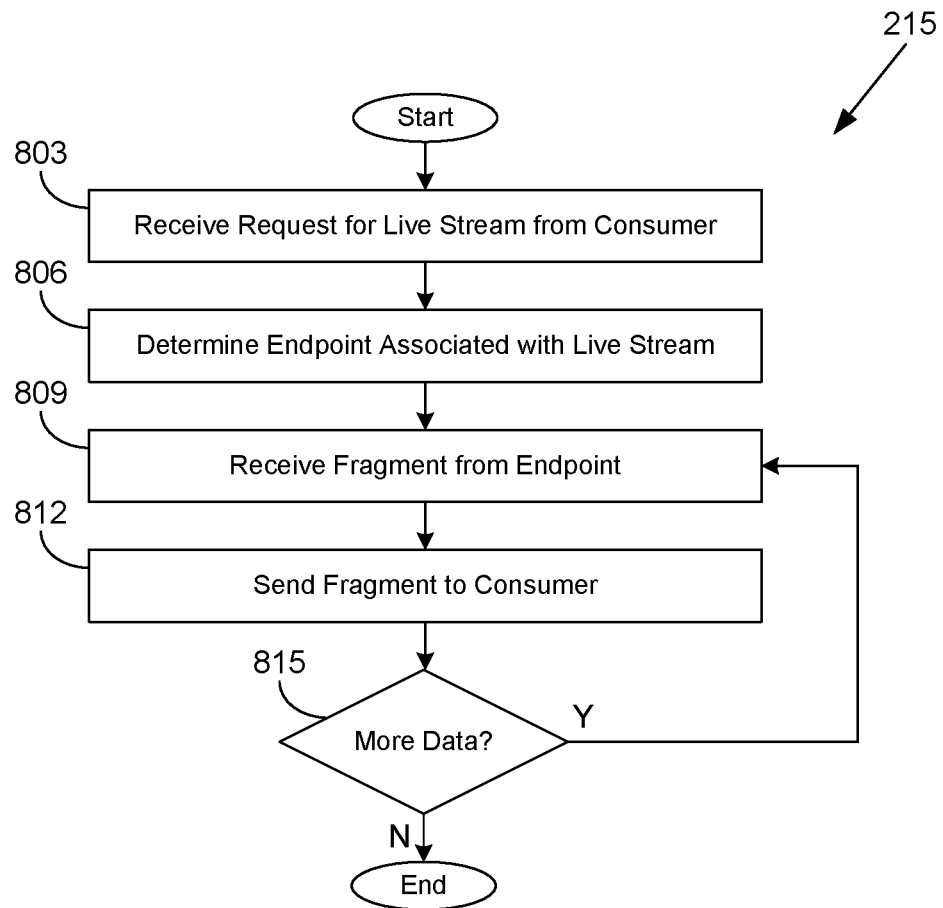
FIGS. 8A, 8B, and 9 are flowcharts illustrating examples of functionality implemented as portions of a streaming gateway executed in a computing environment in the networked environment of FIG. 2 according to various embodiments of the present disclosure.

Turning now to FIG. 8A, shown is a flowchart that provides one example of the operation of a portion of the streaming gateway 215 according to various embodiments. It is understood that the flowchart of FIG. 8A provides merely an example of the many different types of functional arrangements that may be employed to implement the operation of the portion of the streaming gateway 215 as described herein. As an alternative, the flowchart of FIG. 8A may be viewed as depicting an example of elements of a method implemented in the computing environment 203 (FIG. 2) according to one or more embodiments.

Beginning with box 803, the streaming gateway 215 receives a request from a consumer application 245 (FIG. 2) to receive a live stream of time-associated data via the network 212 (FIG. 2). In box 806, the streaming gateway 215 determines the endpoint service 218 (FIG. 2) that is currently receiving the stream from the producer application 239 (FIG. 2). In box 809, the streaming gateway 215 receives a current fragment 124 (FIG. 2) of the stream from the endpoint service 218.

In box 812, the streaming gateway 215 sends the fragment 124 to the consumer application 245 via the network 212. In box 815, the streaming gateway 215 determines whether there is more data in the stream to send (i.e., whether the live stream is continuing). If there is more data in the stream, the streaming gateway 215 returns to box 809 and receives a next fragment 124 from the endpoint service 218. Thereafter, the operation of the portion of the streaming gateway 215 ends.

Figure 8B:
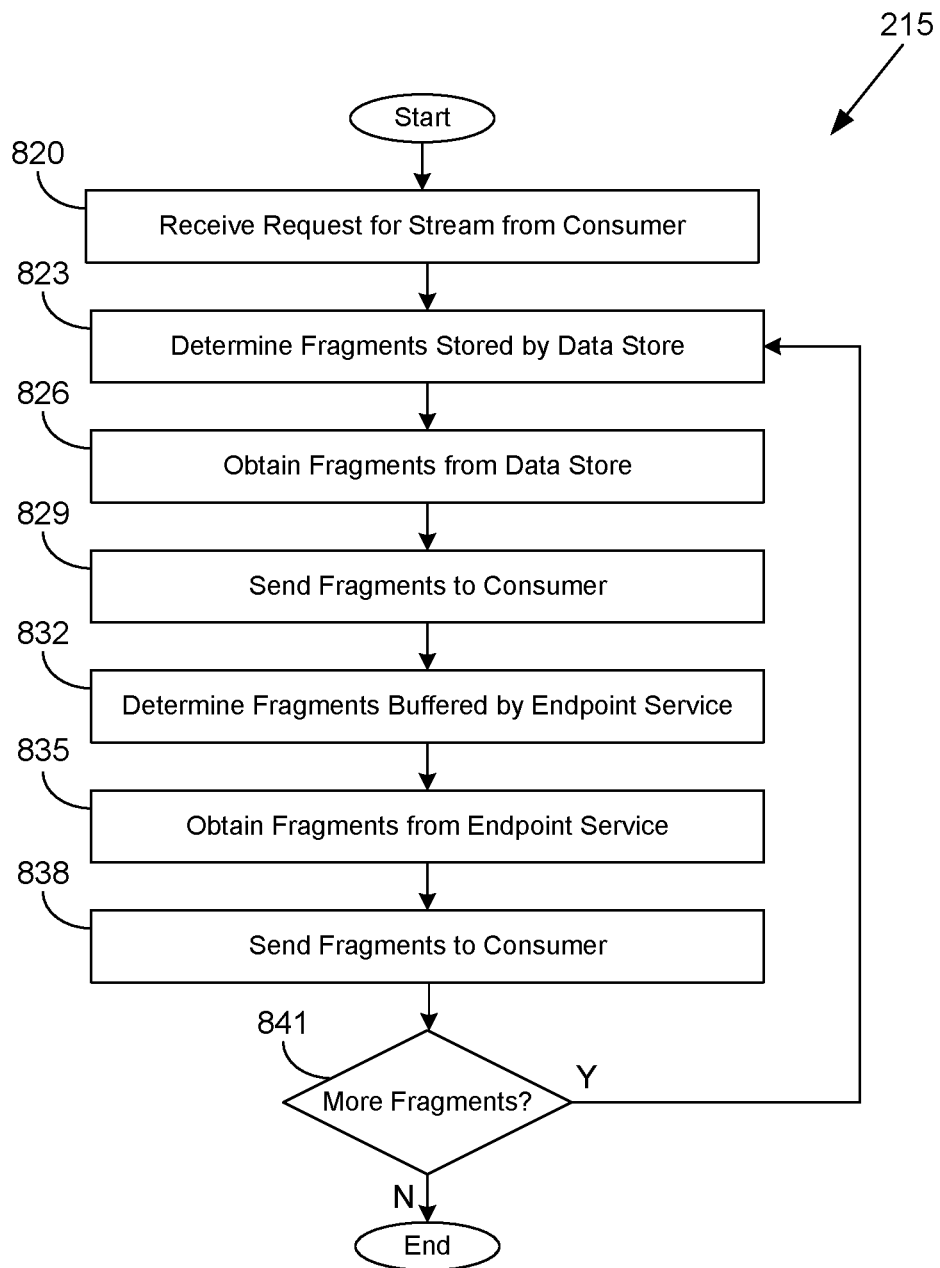

Referring next to FIG. 8B, shown is a flowchart that provides one example of the operation of another portion of the streaming gateway 215 according to various embodiments. It is understood that the flowchart of FIG. 8B provides merely an example of the many different types of functional arrangements that may be employed to implement the operation of the portion of the streaming gateway 215 as described herein. As an alternative, the flowchart of FIG. 8B may be viewed as depicting an example of elements of a method implemented in the computing environment 203 (FIG. 2) according to one or more embodiments.

Beginning with box 820, the streaming gateway 215 receives a request for a stream of time-associated data from a consumer application 245 (FIG. 2) via the network 212 (FIG. 2). The request may specify a start time and/or an end time. In box 823, the streaming gateway 215 determines fragments 124 (FIG. 2) of the stream that are stored by the data store 213 (FIG. 2) that are on or after the specified start time, but before or up to the specified end time. These fragments 124 may be determined via a query to the persisted fragment index 230 (FIG. 2) by way of the indexing service 115 (FIG. 2). In box 826, the streaming gateway 215 obtains the fragments 124 from the data store 213. In box 829, the streaming gateway 215 sends the fragments 124 to the consumer application 245 via the network 212. It is noted that multiple fragments 124 may be sent in parallel or at a data rate higher than the data rate of the stream.

In box 832, the streaming gateway 215 determines fragments 124 that are buffered by an endpoint service 218 (FIG. 2) in a fragment buffer 227 (FIG. 2), where the fragments 124 are on or after the start time, but before or up to the end time. Such fragments 124 may not yet be persisted by the data store 213. These fragments 124 may be determined via a query to the buffered fragment index 233 (FIG. 2) by way of the indexing service 115. In box 835, the streaming gateway 215 obtains the fragments 124 from the endpoint service 218. In box 838, the streaming gateway 215 sends the fragments 124 to the consumer application 245 via the network 212. Similarly, it is noted that multiple fragments 124 may be sent in parallel or at a data rate higher than the data rate of the stream.

Although FIG. 8B depicts fragments 124 first being sent from a data store 213 and then being sent from a fragment buffer 227, in some scenarios, the streaming gateway 215 may switch back and forth between these sources, particularly when the consumer connection or consumption rate is variable.

In box 841, the streaming gateway 215 determines whether there are more fragments 124 to be sent. For example, the stream may be continued to be generated, and additional fragments 124 may be persisted and/or buffered. If there are more fragments 124, the streaming gateway 215 may return to box 823 and/or box 832. Also, where the stream is a live stream that is on-going, the streaming gateway 215 may catch up in sending the fragments 124 so that they are being received from the endpoint service 218 and sent to the consumer application 245 in a live, real-time manner. Otherwise, if there are no additional fragments 124, the operation of the portion of the streaming gateway 215 ends.

Figure 9:
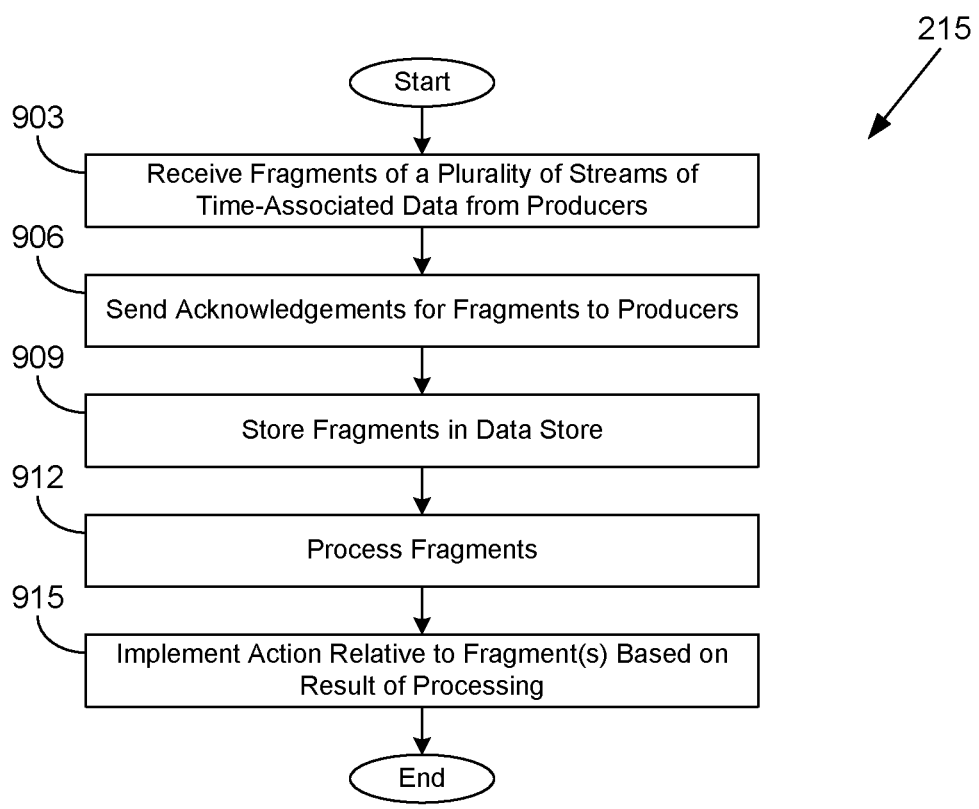

With reference to FIG. 9, shown is a flowchart that provides one example of the operation of a portion of the streaming gateway 215 according to various embodiments. It is understood that the flowchart of FIG. 9 provides merely an example of the many different types of functional arrangements that may be employed to implement the operation of the portion of the streaming gateway 215 as described herein. As an alternative, the flowchart of FIG. 9 may be viewed as depicting an example of elements of a method implemented in the computing environment 203 (FIG. 2) according to one or more embodiments.

Beginning with box 903, the streaming gateway 215, via an endpoint service 218 (FIG. 2), receives fragments 124 (FIG. 2) of a plurality of streams of time-associated data from a plurality of producer applications 239 (FIG. 2) executed in a plurality of producer client devices 206. The fragments 124 are received via a network 212 (FIG. 2) using an application-layer protocol. For example, the streams may correspond to video streams generated by a plurality of video cameras as stream sources 236. In box 906, the streaming gateway 215, via an endpoint service 218, sends acknowledgements of the fragments 124 to the respective producer applications 239 via the network 212.

In box 909, the streaming gateway 215 causes the fragments 124 to be stored in a data store, such as the data store 213 (FIG. 2). In box 912, the streaming gateway 215 causes one or more processing engines 221 (FIG. 2) to process the fragments 124. For example, the processing engines 221 may recognize a person or an entity depicted in a respective fragment 124, determine that the person or entity depicted in the respective fragment 124 is associated with a predetermined condition, determine that a product depicted in the respective fragment 124 is defective, determine that motion is present in the respective fragment 124 beyond a threshold, and other forms of processing. In some cases, the processing by the processing engines 221 may begin before the entirety of the fragment 124 is received.

In box 915, the streaming gateway 215 implements one or more actions relative to the fragments 124 based at least in part on the result of the processing. Such actions may include generating an alarm, discarding the respective fragment 124 from the data store 213, applying a data reduction to the respective fragment 124 (e.g., compressing with a higher rate of compression, converting to a lower resolution, converting to a lower frame rate, etc.), generating a composite fragment 124 from two or more fragments 124 (e.g., combining video streams together, aggregating two radar data streams to generate a higher resolution stream, etc.). Thereafter, the operation of the portion of the streaming gateway 215 ends.

Figure 10:
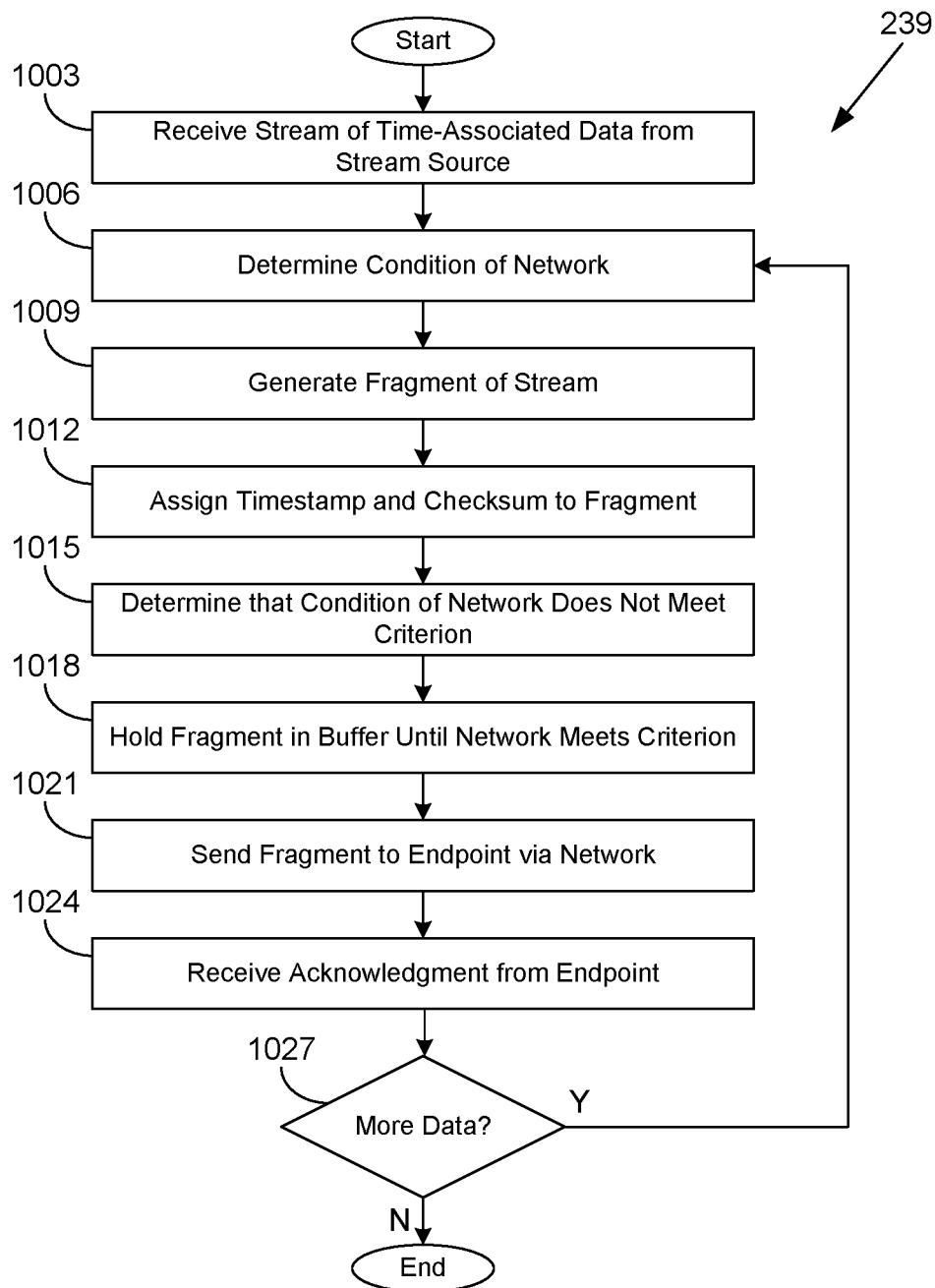
FIG. 10 is a flowchart illustrating one example of functionality implemented as portions of a producer application executed in a producer computing device in the networked environment of FIG. 2 according to various embodiments of the present disclosure.

Referring next to FIG. 10, shown is a flowchart that provides one example of the operation of a portion of the producer application 239 according to various embodiments. In particular, the producer application 239 in this example is implemented in a mobile computing device or another device that has intermittent network connectivity. It is understood that the flowchart of FIG. 10 provides merely an example of the many different types of functional arrangements that may be employed to implement the operation of the portion of the producer application 239 as described herein. As an alternative, the flowchart of FIG. 10 may be viewed as depicting an example of elements of a method implemented in the producer client device 206 (FIG. 2) according to one or more embodiments.

Beginning with box 1003, the producer application 239 receives a stream of time-associated data from a stream source 236 (FIG. 2). In box 1006, the producer application 239 determines a condition of the network 212 (FIG. 2). The condition may relate to a bandwidth or congestion of the network 212, or a specific type of network (e.g., Wi-Fi v. cellular data). In box 1009, the producer application 239 generates a fragment 124 of the stream. In box 1012, the producer application 239 assigns a producer timestamp 312 to the fragment 124 and may compute a producer checksum 318.

In box 1015, the producer application 239 determines that the condition of the network 212 does not meet the criterion. For example, the criterion may require that the network 212 have at least 1 Mbps in bandwidth, or that Wi-Fi used instead of cellular data. In box 1018, the producer application 239 may hold the fragment 124 in a fragment buffer 242 (FIG. 2) until the network 212 meets the criterion. Alternatively or additionally, the producer application 239 may transcode the fragment 124 to a lower size (e.g., lower bitrate, resolution, or frame rate) and send the reduced size fragment 124 to an endpoint service 218 (FIG. 2) via the network 212 using the application-layer protocol.

In box 1021, upon the network 212 meeting the criterion, the producer application 239 sends the fragment 124 to the endpoint service 218 via the network 212 using the application-layer protocol. In box 1024, the producer application 239 receives one or more acknowledgments from the endpoint service 218. In box 1027, the producer application 239 determines whether the stream includes more data to be sent. If so, the producer application 239 may return to box 1006 and reassess the condition of the network 212. Otherwise, if no more data remains to be sent, the operation of the portion of the producer application 239 ends. It is noted that multiple fragments 124 may be held in a fragment buffer 242 under box 1018 until the network 212 meets the criterion, as portions of the flowchart of FIG. 10 may be performed in parallel.

Next, several non-limiting examples of usage scenarios of the present disclosure will be discussed. In one scenario, an industrial facility maintains dozens of video cameras to record areas of the facility for security purposes. Each of these cameras is equipped with a producer client device 206 and a producer application 239 and uploads a video stream to a computing environment 203 as discussed. Most of the time, the cameras record essentially a still picture, with no movement. However, the fragments 124 of the video stream are passed to a processing engine 221 that is configured to recognize movement beyond a threshold. If movement or motion is detected from a camera, an alarm notification may be generated, and security personnel may be directed to watch a video stream from a point at which the motion is detected.

In another scenario, police officers are directed to wear bodycams to capture video streams. The bodycams include producer applications 239 that upload the video to the computing environment 203 to be stored and archived. However, the police officer may be in a network dead-zone or may not have high-speed network upload capability. Thus, the producer application 239 may store the fragments 124 of the video stream in a fragment buffer 242 until the police officer is in a location where network connectivity is available. In some cases, the producer application 239 may upload a lower-quality stream of fragments 124, which may be replaced in the archive in the data store 213 with higher-quality fragments 124 when it is possible to upload the higher-quality fragments 124 based on the network 212 availability.

In another scenario, a producer application 239 may be integrated into a baby monitoring system. The fragments 124 of the video stream may be passed to processing engines 221 that are configured to determine whether the baby is in distress (e.g., by observing motion associated with distress). In some cases, the video stream may be paired with an audio stream and sensor data streams for the processing engines 221 to analyze to determine whether the baby is in distress. If the baby is determined to be in distress, an alarm notification may be generated, and the parents may be invited to view the video stream and listen to the audio stream. As the fragments 124 are archived, the parents may view the portion of the streams that were archived in addition to the real-time stream.

In another scenario, a materials handling facility such as a manufacturing plant may employ cameras to record video of products leaving an assembly line. The video streams may be uploaded to the computing environment 203, and the video streams may be processed via the processing engines 221 to determine whether defects are exhibited in the video fragments 124. For example, a manufactured item may be captured exiting a conveyor belt, and the processing engine 221 may determine through image analysis that a metal weld on the item appears to be defective. An image or video of the item may be flagged for manual analysis, and/or the item may be rerouted in the facility for further manual inspection.

The system described herein may also be used in cameras of autonomous vehicles and for traffic analysis. For example, video streams from red light cameras or license plate cameras may be uploaded via a producer application 239 and archived in the data store 213.

The system described herein may also be used in smart stores, where customers are recorded to track their purchases. Video streams from numerous cameras may be uploaded and processed to determine that a customer has removed an item from a shelf and/or removed the item from the store. The processing may trigger a workflow that notifies the customer and processes payment. The video fragments 124 associated with determining that the customer has obtained the item or exited the store with the item may be archived for auditing or if the customer questions whether the purchase occurred.

The system described herein may also be used for recording home security cameras, particularly in combination with sensors that indicate that a door has been opened, which may trigger recording or persisting the video stream data from the cameras.

The system described herein may also be used for recording video within or about appliances. For example, a refrigerator may include various video cameras that upload video streams for processing. The video stream, when processed, may indicate that a certain item (e.g., milk) has likely spoiled because it has been in the refrigerator beyond a predefined time period (e.g., six weeks). The video stream, when processed, may indicate that a certain item has been used up and should be reordered automatically.

The system described herein may also be used in the medical field with respect to image processing in magnetic resonance imaging (MRI), computed tomography scans, and/or other medical imaging where it may be desirable to view the video in real-time, archive the video, and/or perform arbitrary processing on the imaging.

The system described herein may also be used to aggregate radar data, Lidar data, infrared data, and/or other sensor data, where multiple data streams may be received in real-time and then processed to create aggregate streams of higher resolution.

The system described herein may also be used for analysis of agricultural data. Aerial vehicles, such as drones, may be used to capture video data, infrared data, moisture data, etc., of crop lands. The system herein can process such streams of time-associated data to generate useful results, such as predicted yield of a crop field or portions of a crop field that may need pesticides, added nutrients, more watering, etc.

Several non-limiting consumer-related use cases will next be discussed. Suppose that a continuous consumer would like to process incoming data with as little end-to-end latency as possible. However, the consumer may not tolerate skipping over data in the stream. One example would be a facial recognition algorithm that is detecting and identifying all the faces shown in a video stream. Although the processing engine 221 implementing the algorithm may need to identify the faces with low latency, the consumer would still want to detect and identify all faces. It would be preferable to process all the data in the stream and have a higher end-to-end delay until it catches up to the tip of the stream rather than to skip detecting any faces.

In another scenario, a consumer triggered by an external event may begin to read a stream continuously from a stream starting at the time of the external event. The consumer may want low end-to-end latency while reading the stream but does not want to skip over data in the stream. For example, a motion triggered camera generates an event and sends video as a producer application 239. Processing the event starts a consumer application 245 that processes data from the time of the trigger. Once the consumer application 245 is caught up, it wants to continue processing data with as little latency as possible until a second event indicates that it should stop.

In another scenario, a continuous consumer may want to process data in a stream with low end-to-end latency but skip over fragments 124 if it is too far behind. For example, a home automation video surveillance application that can tolerate transient latencies of single digit seconds may skip over data to keep up if it falls further behind.

In another scenario, a continuous consumer may be far less latency sensitive and prefer complete fragments 124. For example, an indexing processing engine 221 that identifies objects in a video fragment 124 and tags the fragment 124 with the identified objects for possible later retrieval. The processing engine 221 can tolerate latencies of up to single digit numbers in seconds, and even when the latency is higher, it may prefer to process all the data rather than to skip over to the latest.

In another scenario, there may be a latency tolerant consumer that is triggered by an event. This can be useful to run a secondary slower consumer over a certain time period of data in a stream when the primary continuous consumer detects a problem. For example, in face identification, a primary continuous consumer (i.e., a processing engine 221) may have low confidence in identifying a face, but it can trigger a second consumer (i.e., another processing engine 221) for that period of data. The second consumer would use a different and potentially slower algorithm to identify the face and update the conclusions of the first consumer.

In yet another scenario, a batch processing application can run on demand to process data for a specific period of time. Such an application might process long periods of data from a large number of streams. The application may not be latency sensitive but may want complete fragments 124, sorted by producer timestamp 309. For example, during a crash test, multiple cameras and sensors may record the test. When an investigation identifies an event of interest at a particular time, multiple streams recorded during that time may need to be viewed and processed, either through a single consumer or by multiple consumers concurrently.

Figure 11:
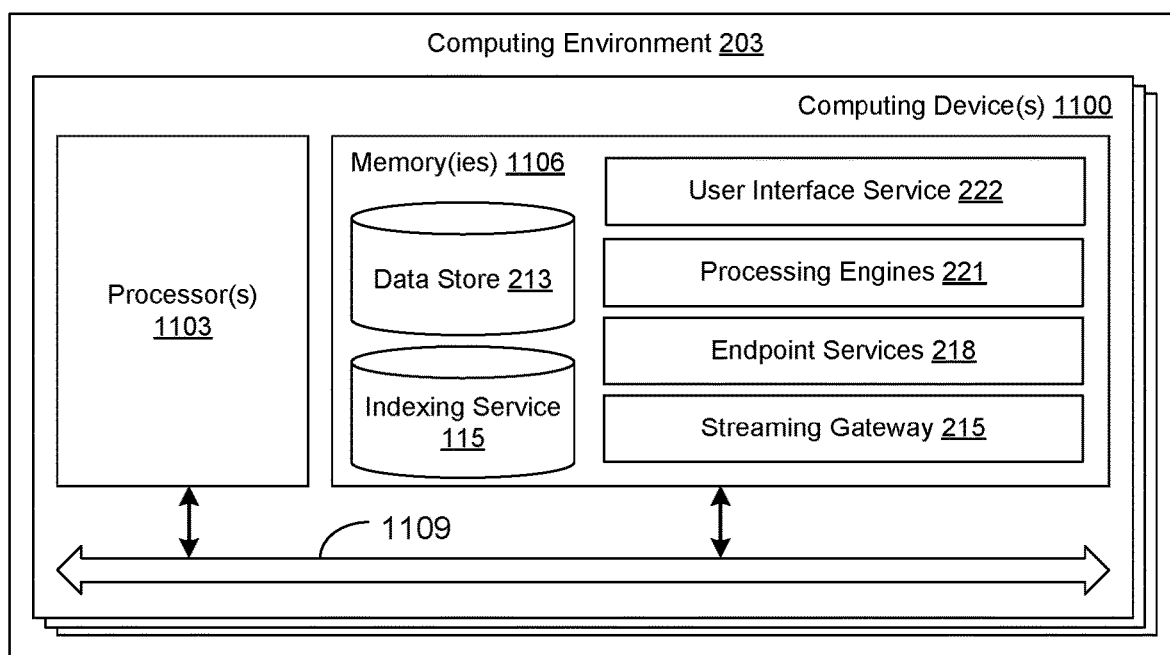
FIG. 11 is a schematic block diagram that provides one example illustration of a computing environment employed in the networked environment of FIG. 2 according to various embodiments of the present disclosure.

With reference to FIG. 11, shown is a schematic block diagram of the computing environment 203 according to an embodiment of the present disclosure. The computing environment 203 includes one or more computing devices 1100. Each computing device 1100 includes at least one processor circuit, for example, having a processor 1103 and a memory 1106, both of which are coupled to a local interface 1109. To this end, each computing device 1100 may comprise, for example, at least one server computer or like device. The local interface 1109 may comprise, for example, a data bus with an accompanying address/control bus or other bus structure as can be appreciated.

Stored in the memory 1106 are both data and several components that are executable by the processor 1103. In particular, stored in the memory 1106 and executable by the processor 1103 are the user interface service 222, the processing engines 221, the endpoint services 218, the streaming gateway 215, and potentially other applications. Also stored in the memory 1106 may be a data store such as the data store 213 and the indexing service 115 and other data. In addition, an operating system may be stored in the memory 1106 and executable by the processor 1103.

It is understood that there may be other applications that are stored in the memory 1106 and are executable by the processor 1103 as can be appreciated. Where any component discussed herein is implemented in the form of software, any one of a number of programming languages may be employed such as, for example, C, C++, C #, Objective C, Java®, JavaScript®, Perl, PHP, Visual Basic®, Python®, Ruby, Flash®, or other programming languages.

A number of software components are stored in the memory 1106 and are executable by the processor 1103. In this respect, the term "executable" means a program file that is in a form that can ultimately be run by the processor 1103. Examples of executable programs may be, for example, a compiled program that can be translated into machine code in a format that can be loaded into a random access portion of the memory 1106 and run by the processor 1103, source code that may be expressed in proper format such as object code that is capable of being loaded into a random access portion of the memory 1106 and executed by the processor 1103, or source code that may be interpreted by another executable program to generate instructions in a random access portion of the memory 1106 to be executed by the processor 1103, etc. An executable program may be stored in any portion or component of the memory 1106 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 1106 is defined herein as including both volatile and nonvolatile memory and data storage components. Volatile components are those that do not retain data values upon loss of power. Nonvolatile components are those that retain data upon a loss of power. Thus, the memory 1106 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 1103 may represent multiple processors 1103 and/or multiple processor cores and the memory 1106 may represent multiple memories 1106 that operate in parallel processing circuits, respectively. In such a case, the local interface 1109 may be an appropriate network that facilitates communication between any two of the multiple processors 1103, between any processor 1103 and any of the memories 1106, or between any two of the memories 1106, etc. The local interface 1109 may comprise additional systems designed to coordinate this communication, including, for example, performing load balancing. The processor 1103 may be of electrical or of some other available construction.

Although the user interface service 222, the processing engines 221, the endpoint services 218, the streaming gateway 215, the data store 213, the indexing service 115, the producer application 239 (FIG. 2), the consumer application 245 (FIG. 2), and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 4-10 show the functionality and operation of an implementation of portions of the endpoint services 218, the streaming gateway 215, the producer application 239, and the consumer application 245. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 1103 in a computer system or other system. The machine code may be converted from the source code, etc. If embodied in hardware, each block may represent a circuit or a number of interconnected circuits to implement the specified logical function(s).

Although the flowcharts of FIGS. 4-10 show a specific order of execution, it is understood that the order of execution may differ from that which is depicted. For example, the order of execution of two or more blocks may be scrambled relative to the order shown. Also, two or more blocks shown in succession in FIGS. 4-10 may be executed concurrently or with partial concurrence. Further, in some embodiments, one or more of the blocks shown in FIGS. 4-10 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the user interface service 222, the processing engines 221, the endpoint services 218, the streaming gateway 215, the data store 213, the indexing service 115, the producer application 239, and the consumer application 245, that comprises software or code can be embodied in any non-transitory computer-readable medium for use by or in connection with an instruction execution system such as, for example, a processor 1103 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the user interface service 222, the processing engines 221, the endpoint services 218, the streaming gateway 215, the data store 213, the indexing service 115, the producer application 239, and the consumer application 245, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 1100, or in multiple computing devices 1100 in the same computing environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Embodiments of the present disclosure may be defined, for example, by the following clauses:

1. A system, comprising: a first computing device; and an endpoint service executable in the first computing device, wherein when executed the endpoint service causes the first computing device to at least: receive a first fragment of a video stream from a producer executed in a second computing device via a network using an application layer protocol; determine a first timestamp from the first fragment; assign a first unique fragment identifier and a second timestamp to the first fragment; and send a first acknowledgement, a second acknowledgment, and a third acknowledgment for the first fragment to the producer via the network using the application-layer protocol, the first acknowledgement indicating that the endpoint service has begun to receive data from the first fragment, the second acknowledgement indicating that the endpoint service has completed receiving the data from the first fragment, the third acknowledgment indicating that the endpoint service has completed storing the first fragment in a data store.

2. The system of clause 1, wherein the first fragment is generated so that the first fragment begins with an independent video frame.

3. The system of clauses 1 to 2, wherein when executed the endpoint service further causes the first computing device to at least: send a non-acknowledgment for a second fragment of the video stream to the producer via the network using the application-layer protocol, the non-acknowledgement indicating at least one of: a failure of the endpoint service to receive data from the second fragment, an error in the second fragment, or an error in storing the second fragment in the data store.

4. A system, comprising: at least one computing device; and an endpoint service executable in the at least one computing device, wherein when executed the endpoint service causes the at least one computing device to at least:

receive a first fragment of a stream of time-associated data via a network using an application-layer protocol from a producer, the first fragment being identified as having a first timestamp assigned by the producer; assign a first unique fragment identifier and a second timestamp to the first fragment; and send at least one acknowledgement for the first fragment to the producer via the network using the application-layer protocol.

5. The system of clause 4, wherein when executed the endpoint service further causes the at least one computing device to at least: receive a first instance of a second fragment of the stream of time-associated data, the second fragment being identified as having a third timestamp assigned by the producer; determine that the second fragment has an error; send a non-acknowledgement for the second fragment to the producer via the network using the application-layer protocol; and receive a second instance of the second fragment of the stream of time-associated data from the producer, the second fragment being identified as having the third timestamp.

6. The system of clauses 4 to 5, further comprising a streaming gateway executable in the at least one computing device, wherein when executed the streaming gateway further causes the at least one computing device to at least: receive a request for a network address of the endpoint service from the producer via the network; select an instance of the endpoint service from a plurality of instances of the endpoint service; and send the network address of the instance of the endpoint service via the network to the producer.

7. The system of clauses 4 to 6, wherein the producer receives the stream of time-associated data by reading the stream of time-associated data from a data store.

8. The system of clause 7, wherein the producer determines the first timestamp based at least in part on a stored timestamp associated with the stream of time-associated data.

9. The system of clauses 4 to 8, wherein the producer receives the stream of time-associated data in real-time from a source.

10. The system of clause 9, wherein the producer determines the first timestamp based at least in part on a current time.

11. The system of clauses 4 to 10, wherein the producer stores the first fragment in a local cache until the at least one acknowledgment for the first fragment has been received.

12. The system of clauses 4 to 11, wherein the first fragment is generated based at least in part on a predefined time length or a predefined size.

13. The system of clauses 4 to 12, wherein the at least one acknowledgement identifies the first fragment by the first timestamp.

14. The system of clauses 4 to 13, wherein the at least one acknowledgement comprises an acknowledgment that the endpoint service has begun to receive data from the first fragment.

15. The system of clauses 4 to 14, wherein the at least one acknowledgement comprises an acknowledgment that the endpoint service has completed receiving data from the first fragment.

16. The system of clauses 4 to 15, wherein the at least one acknowledgement comprises an acknowledgment that the endpoint service has completed sending the first fragment to a destination.

17. A method, comprising: receiving, by at least one computing device, a stream of time-associated data from a source; generating, by the at least one computing device, a first fragment of the stream of time-associated data; assigning, by the at least one computing device, a first timestamp to the first fragment; sending, by the at least one computing device, the first fragment via a network using an application-layer protocol to an endpoint, the first fragment being identified as having the first timestamp; receiving, by the at least one computing device, information from the endpoint indicating congestion on the network, the information being received using the application-layer protocol; and adjusting, by the at least one computing device, a parameter of the source to reduce a data size of a second fragment of the stream of time-associated data.

18. The method of clause 17, further comprising receiving at least one acknowledgement for the first fragment from the endpoint via the network using the application-layer protocol.

19. The method of clauses 17 to 18, wherein the information from the endpoint comprises a non-acknowledgement of the first fragment.

20. The method of clauses 17 to 19, wherein the stream of time-associated data comprises a video stream, and the parameter causes at least one of: a change to a compression method used to generate the video stream, a change to a resolution of the video stream, or a change to a frame rate of the video stream.

21. A system, comprising: at least one computing device; and a stream endpoint application executable in the at least one computing device, wherein when executed the stream endpoint application causes the at least one computing device to at least: receive a first fragment of a video stream from a producer via a network using an application-layer protocol; determine a producer timestamp from the first fragment; send at least one first acknowledgment to the producer via the network using the application-layer protocol; assign a unique fragment identifier to the first fragment; index the first fragment based at least in part on the unique fragment identifier and an endpoint timestamp determined relative to the stream endpoint application receiving the first fragment; send the first fragment to a destination; and send a third acknowledgment to the producer via the network using the application-layer protocol in response to the first fragment being processed by the destination.

22. The system of clause 21, wherein the first fragment comprises a plurality of video frames.

23. The system of clauses 21 to 22, wherein the destination is a data store, and the first fragment is stored in the data store in association with the unique fragment identifier, the producer timestamp, and the endpoint timestamp.

24. A system, comprising: at least one computing device; and a stream endpoint application executable in the at least one computing device, wherein when executed the stream endpoint application causes the at least one computing device to at least: receive a first fragment of a stream of time-associated data from a producer via a network using an application-layer protocol; determine a producer timestamp from the first fragment; send at least one acknowledgment to the producer via the network using the application-layer protocol; assign a unique fragment identifier to the first fragment; index the first fragment based at least in part on the unique fragment identifier; and send the first fragment to a destination.

25. The system of clause 24, wherein the at least one acknowledgement comprises an acknowledgement that the stream endpoint application has begun to receive data from the first fragment.

26. The system of clauses 24 to 25, wherein the at least one acknowledgement comprises an acknowledgement that the stream endpoint application has completed receiving data from the first fragment.

27. The system of clauses 24 to 26, wherein the destination comprises a data store, and the at least one acknowledgement comprises an acknowledgement that the first fragment has been stored in the data store.

28. The system of clauses 24 to 27, wherein the destination comprises a data store, and when executed the stream endpoint application further causes the at least one computing device to at least: determine that the storage of the first fragment in the data store is delayed; and send a notification that the storage of the first fragment is delayed to the producer via the network using the application-layer protocol.

29. The system of clauses 24 to 28, wherein when executed the stream endpoint application further causes the at least one computing device to at least: receive a second fragment of the stream of time-associated data from the producer via the network using the application-layer protocol; determine a second producer timestamp from the second fragment; determine that the second fragment includes an error; and send a notification of the error to the producer via the network using the application-layer protocol.

30. The system of clauses 24 to 29, wherein when executed the stream endpoint application further causes the at least one computing device to at least: receive a second fragment of the stream of time-associated data from the producer via the network using the application-layer protocol; and combine the first fragment with the second fragment before storing the first fragment and the second fragment as a single data item in a data store.

31. The system of clauses 24 to 30, wherein when executed the stream endpoint application further causes the at least one computing device to at least: determine that the first fragment exceeds a maximum fragment size for processing by the destination; divide the first fragment into a plurality of portions; and wherein sending the first fragment to the destination further comprises sending the plurality of portions of the first fragment to the destination.

32. The system of clauses 24 to 31, wherein when executed the stream endpoint application further causes the at least one computing device to at least: determine a received timestamp for the first fragment corresponding to a time at which the first fragment is received from the producer; and index the first fragment based at least in part on the received timestamp.

33. The system of clauses 24 to 32, wherein when executed the stream endpoint application further causes the at least one computing device to at least: process the first fragment via a processing application, thereby producing a processed first fragment; and storing the processed first fragment in a data store.

34. The system of clauses 24 to 33, wherein when executed the stream endpoint application further causes the at least one computing device to at least: process the first fragment via a processing application, thereby generating a tag describing content of the first fragment; and index the first fragment based at least in part on the tag describing the content of the first fragment.

35. The system of clauses 24 to 34, further comprising a load balancer, wherein when executed the load balancer further causes the at least one computing device to at least: receive a request via the network from the producer to send the stream of time-associated data; determine an instance of the stream endpoint application from a plurality of instances of the stream endpoint application executed in different ones of a plurality of computing devices, wherein the at least one computing device comprises the plurality of computing devices; and return a network address corresponding to the instance of the stream endpoint application to the producer.

36. The system of clauses 24 to 35, further comprising a gateway, wherein when executed the gateway further causes the at least one computing device to at least: receive a request via the network from a consumer to receive the stream of time-associated data in real-time; determine an instance of the stream endpoint application that is receiving the stream of time-associated data from the producer; receive the first fragment from the stream endpoint application; and forward the first fragment to the consumer via the network.

37. A method, comprising: receiving, by at least one computing device, a request via a network from a consumer to receive a stream of time-associated data in real-time; determining, by the at least one computing device, a first endpoint from a plurality of endpoints, wherein the first endpoint is receiving the stream of time-associated data from a producer; receiving, by the at least one computing device, a first fragment of the stream of time-associated data from the first endpoint; and forwarding, by the at least one computing device, the first fragment to the consumer via the network using an application-layer protocol.

38. The method of clause 37, further comprising: receiving, by the at least one computing device, a second fragment of the stream of time-associated data from the first endpoint; and forwarding, by the at least one computing device, the second fragment to the consumer via the network using the application-layer protocol, wherein the first and second fragment are identified by respective unique fragment identifiers.

39. The method of clauses 37 to 38, further comprising: determining, by the at least one computing device, that at least one second fragment of the stream of time-associated data is stored in a data store, the at least one second fragment being previous in time to the first fragment; loading, by the at least one computing device, the at least one second fragment from the data store; and forwarding, by the at least one computing device, the at least one second fragment to the consumer via the network using an application-layer protocol.

40. The method of clauses 37 to 39, further comprising: determining, by the at least one computing device, a second endpoint from a plurality of endpoints, wherein the second endpoint received at least one second fragment of the stream of time-associated data from the producer; receiving, by the at least one computing device, the at least one second fragment of the stream of time-associated data from the second endpoint; and forwarding, by the at least one computing device, the at least one second fragment to the consumer via the network using the application-layer protocol.

41. A system, comprising: at least one computing device; and a streaming gateway executable in the at least one computing device, wherein when executed the streaming gateway causes the at least one computing device to at least: receive a request from a consumer via a network to obtain a video stream beginning at a start time; determine that a plurality of first fragments of the video stream occurring after the start time are stored in a data store; obtain the plurality of first fragments from the data store; send the plurality of first fragments to the consumer via the network; determine that at least one second fragment of the video stream occurring after the start time and after the plurality of first fragments are buffered in a memory of an endpoint; obtain the at least one second fragment of the video stream from the endpoint; send the at least one second fragment to the consumer via the network; determine that a third fragment of the video stream is currently being received in real-time by the endpoint from a producer; obtain the third fragment from the endpoint; and send the third fragment to the consumer via the network.

42. The system of clause 41, wherein the streaming gateway is configured to send at least two of the first fragments to the consumer via the network in parallel.

43. The system of clauses 41 to 42, wherein the streaming gateway is configured to send at least one of the plurality of first fragments or the at least one second fragment to the consumer via the network at a data rate that is higher than a data rate of the video stream.

44. A system, comprising: at least one computing device; and a streaming gateway executable in the at least one computing device, wherein when executed the streaming gateway causes the at least one computing device to at least: receive a request from a consumer via a network to obtain a stream of time-associated data; determine that at least one first fragment of the stream of time-associated data is stored in a data store; obtain the at least one first fragment from the data store; send the at least one first fragment to the consumer via the network; determine that the stream of time-associated data is currently being received by an endpoint from a producer; obtain a second fragment of the stream of time-associated data from the endpoint; and send the second fragment to the consumer via the network.

45. The system of clause 44, wherein when executed the streaming gateway causes the at least one computing device to at least: generate a listing of unique fragment identifiers corresponding to the at least one first fragment; send the listing of unique fragment identifiers to the consumer; and wherein each of the at least one first fragment is sent to the consumer in response to a respective request received from the consumer specifying a corresponding unique fragment identifier.

46. The system of clauses 44 to 45, wherein the at least one first fragment corresponds to a plurality of first fragments, and the streaming gateway sends at least two of the plurality of first fragments to the consumer in parallel via the network.

47. The system of clauses 44 to 46, wherein when executed the streaming gateway causes the at least one computing device to at least: obtain a third fragment of the stream of time-associated data from the endpoint; and send the third fragment to the consumer via the network.

48. The system of clauses 44 to 47, wherein when executed the streaming gateway causes the at least one computing device to at least: determine that a third fragment of the stream of time-associated data is to be skipped; send metadata with the second fragment to the consumer indicating that the third fragment is to be skipped; obtain a fourth fragment of the stream of time-associated data from the endpoint; and send the fourth fragment to the consumer via the network.

49. The system of clauses 44 to 48, wherein the request from the consumer specifies a start time for the stream of time-associated data, and the at least one first fragment is determined based at least in part on at least one corresponding timestamp for the at least one first fragment being on or after the start time.

50. The system of clause 49, wherein the request from the consumer specifies an end time for the stream of time-associated data, and the at least one first fragment is determined based at least in part on at least one corresponding timestamp for the at least one first fragment being before the end time.

51. The system of clauses 49 to 50, wherein a third fragment of the stream of time-associated data is stored in the data store, the third fragment being earlier in time than the start time, and the streaming gateway refrains from sending the third fragment to the consumer.

52. The system of clauses 44 to 51, wherein when executed the streaming gateway causes the at least one computing device to at least: determine that at least one third fragment of the stream of time-associated data is in a memory buffer of a different endpoint, wherein the at least one third fragment is not stored in the data store; obtain the at least one third fragment of the stream of time-associated data from the different endpoint; and send the at least one third fragment to the consumer via the network.

53. The system of clauses 44 to 52, wherein the streaming gateway sends the at least one first fragment to the consumer via the network at a data rate higher than a data rate of the stream of time-associated data.

54. A method, comprising: sending, by at least one computing device, a request to obtain a stream of time-associated data to a streaming gateway via a network; obtaining, by the at least one computing device, a plurality of first fragments of the stream of time-associated data in parallel, the plurality of first fragments being persisted in a data store; obtaining, by the at least one computing device, a second fragment of the stream of time-associated data as the second fragment is being received from a producer by an endpoint and before the second fragment is persisted in the data store; and processing, by the at least one computing device, the plurality of first fragments and the second fragment in time-sequential order.

55. The method of clause 54, further comprising: detecting, by the at least one computing device, an external event; and sending, by the at least one computing device, the request to obtain the stream of time-associated data in response to the external event.

56. The method of clauses 54 to 55, further comprising obtaining, by the at least one computing device, a third fragment of the stream of time-associated data as the third fragment is being received from the producer by a different endpoint and before the third fragment is persisted in the data store.

57. The method of clauses 54 to 56, further comprising determining, by the at least one computing device, from metadata associated with the second fragment that a third fragment of the stream of time-associated data will be skipped.

58. The method of clauses 54 to 57, wherein the request to obtain the stream of time-associated data specifies a start time, and the plurality of first fragments are associated with respective timestamps occurring after the start time.

59. The method of clauses 54 to 58, wherein the request to obtain the stream of time-associated data specifies an end time, and the plurality of first fragments and the second fragment are associated with respective timestamps occurring before the end time.

60. The method of clauses 54 to 59, wherein the stream of time-associated data corresponds to a video stream, and processing the plurality of first fragments and the second fragment further comprises decoding the plurality of first fragments and the second fragment using a video decoder.

61. A method, comprising: receiving, by at least one computing device, a plurality of video streams from a plurality of video camera sources via a network using an application-layer protocol, wherein each of the plurality of video streams is divided into a plurality of fragments; sending, by the at least one computing device, at least one acknowledgement to each of the plurality of video camera sources for each of the plurality of fragments via the network using the application-layer protocol; storing, by the at least one computing device, one or more of the plurality of fragments in a data store; performing, by the at least one computing device, a processing of each of the plurality of fragments for individual ones of the plurality of video streams, wherein the processing comprises at least one of: recognizing a person or an entity depicted in a respective fragment, determining that the person or the entity depicted in the respective fragment is associated with a predetermined condition, determining that a product depicted in the respective fragment is defective, or determining whether motion is present in the respective fragment beyond a threshold; and implementing, by the at least one computing device, an action relative to the respective fragment based at least in part on a result of the processing, wherein the action comprises at least one of: generating an alarm, discarding the respective fragment from the data store, applying a data reduction to the respective fragment, or generating a composite fragment from the respective fragment and another fragment.

62. The method of clause 61, further comprising sending, by the at least one computing device, the plurality of fragments from at least one of the plurality of video streams to a consumer in real-time.

63. The method of clauses 61 to 62, further comprising: receiving, by the at least one computing device, a request from a consumer via the network for video fragments between a start time and an end time; determining, by the at least one computing device, a plurality of unique fragment identifiers from the plurality of video streams that were received between the start time and the end time; and sending, by the at least one computing device, the video fragments having the plurality of unique fragment identifiers to the consumer via the network.

64. A system, comprising: at least one computing device; and at least one application executable in the at least one computing device, wherein when executed the at least one application causes the at least one computing device to at least: receive a plurality of streams of time-associated data from a plurality of sources via a network using an application-layer protocol, wherein each of the plurality of streams is divided into a plurality of fragments; send at least one acknowledgement to each of the plurality of sources for each of the plurality of fragments via the network using the application-layer protocol; perform a processing of each of the plurality of fragments for individual ones of the plurality of streams; and implement an action relative to a respective fragment based at least in part on a result of the processing.

65. The system of clause 64, wherein the at least one acknowledgement comprises a first acknowledgment that data from the respective fragment has begun to be received, a second acknowledgement that the data from the respective fragment has been completely received, and a third acknowledgement that the respective fragment has been persisted in a data store.

66. The system of clauses 64 to 65, wherein the action comprises discarding the respective fragment without storing the respective fragment in a data store.

67. The system of clauses 64 to 66, wherein the action comprises deleting the respective fragment from a data store.

68. The system of clauses 64 to 67, wherein the action comprises including the respective fragment in the one or more of the plurality of fragments to be stored in a data store.

69. The system of clauses 64 to 68, wherein the action comprises generating an alarm notification.

70. The system of clauses 64 to 69, wherein the action further comprises sending a real-time stream from a corresponding one of the plurality of sources beginning with the respective fragment to a consumer via the network.

71. The system of clauses 64 to 70, wherein the action further comprises sending a plurality of fragments from a corresponding one of the plurality of sources occurring before the respective fragment to a consumer via the network.

72. The system of clauses 64 to 71, wherein the time associated data comprises at least one of: video data, sensor data, radar data, or Lidar data, and the processing comprises combining respective fragments from at least two of the plurality of streams into a single composite fragment.

73. The system of clause 72, wherein the single composite fragment has a higher resolution than individual ones of the respective fragments.

74. The system of clauses 64 to 73, wherein the time-associated data comprises video data, and the processing comprises determining whether the video data in the respective fragment includes motion beyond a threshold.

75. The system of clauses 64 to 74, wherein the time-associated data comprises video data, and the processing comprises recognizing whether the video data in the respective fragment includes a predefined person or entity.

76. The system of clauses 64 to 75, wherein the time-associated data of at least one of the plurality of streams comprises video data from an infant monitor, and the processing comprises recognizing a status of an infant based at least in part on the video data of the respective fragment.

77. The system of clause 76, wherein the time-associated data of at least another one of the plurality of streams comprises audio data from the infant monitor, and the processing comprises recognizing the status of the infant further based at least in part on the audio data in correlation with the video data of the respective fragment.

78. The system of clauses 64 to 77, wherein the time-associated data comprises video data from a materials processing facility, and the processing comprises recognizing whether the video data in the respective fragment shows an item exhibiting a visible defect.

79. A method, comprising: generating, by a mobile computing device, a video stream; determining, by the mobile computing device, a condition of a network; generating, by the mobile computing device, a first fragment of the video stream based at least in part on a predefined time length; assigning, by the mobile computing device, a first unique fragment identifier and a first timestamp to the first fragment; determining, by the mobile computing device, that the condition of the network does not meet a predefined criterion; holding, by the mobile computing device, the first fragment in a buffer until the network meets the predefined criterion; sending, by the mobile computing device, the first fragment via the network using an application-layer protocol to an endpoint on a second computing device, the first fragment being identified as having the first unique fragment identifier and the first timestamp; and receiving, by the mobile computing device, at least one acknowledgement for the first fragment from the endpoint via the network using the application-layer protocol.

80. The method of clause 79, further comprising: generating, by the mobile computing device, a data-reduced version of the first fragment; and in response to determining that the condition of the network does not meet the predefined criterion, sending, by the mobile computing device, the data-reduced version of the first fragment via the network using the application-layer protocol to the endpoint.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A system, comprising:
a first computing device; and
an endpoint service executable in the first computing device, wherein when executed the endpoint service causes the first computing device to at least:
receive a first fragment of a video stream from a producer executed in a second computing device via a network using an application layer protocol;
determine a first timestamp from the first fragment;
assign a first unique fragment identifier and a second timestamp to the first fragment; and
send a first acknowledgement, a second acknowledgment after sending the first acknowledgement, and a third acknowledgment after sending the second acknowledgement for the first fragment to the producer via the network using the application-layer protocol, the first acknowledgement indicating that the endpoint service has begun to receive data from the first fragment, the second acknowledgement indicating that the endpoint service has completed receiving the data from the first fragment, the third acknowledgment indicating that the endpoint service has completed storing the first fragment in a data store, wherein the first, second, and third acknowledgements identify the first fragment by the first timestamp.

2. The system of claim 1, wherein the first fragment is generated so that the first fragment begins with an independent video frame.

3. The system of claim 1, wherein when executed the endpoint service further causes the first computing device to at least:
send a non-acknowledgment for a second fragment of the video stream to the producer via the network using the application-layer protocol, the non-acknowledgement indicating at least one of: a failure of the endpoint service to receive data from the second fragment, an error in the second fragment, or an error in storing the second fragment in the data store.

4. The system of claim 1, wherein the first fragment is generated based at least in part on a predefined time length or a predefined size.

5. A system, comprising:
at least one computing device; and
an endpoint service executable in the at least one computing device, wherein when executed the endpoint service causes the at least one computing device to at least:
receive a first fragment of a stream of time-associated data via a network using an application-layer protocol from a producer, the first fragment being identified as having a first timestamp assigned by the producer;
assign a first unique fragment identifier and a second timestamp to the first fragment; and
send a first acknowledgement, a second acknowledgement after sending the first acknowledgement, and a third acknowledgment after sending the second acknowledgement for the first fragment to the producer via the network using the application-layer protocol, the first acknowledgement indicating that the endpoint service has begun to receive data from the first fragment, the second acknowledgement indicating that the endpoint service has completed receiving the data from the first fragment, the third acknowledgment indicating that the endpoint service has completed storing the first fragment in a data store, wherein the first, second, and third acknowledgements identify the first fragment by the first timestamp.

6. The system of claim 5, wherein when executed the endpoint service further causes the at least one computing device to at least:
receive a first instance of a second fragment of the stream of time-associated data, the second fragment being identified as having a third timestamp assigned by the producer;
determine that the second fragment has an error;
send a non-acknowledgement for the second fragment to the producer via the network using the application-layer protocol; and
receive a second instance of the second fragment of the stream of time-associated data from the producer, the second fragment being identified as having the third timestamp.

7. The system of claim 5, further comprising a streaming gateway executable in the at least one computing device, wherein when executed the streaming gateway further causes the at least one computing device to at least:
receive a request for a network address of the endpoint service from the producer via the network;
select an instance of the endpoint service from a plurality of instances of the endpoint service; and
send the network address of the instance of the endpoint service via the network to the producer.

8. The system of claim 5, wherein the producer receives the stream of time-associated data by reading the stream of time-associated data from a data store.

9. The system of claim 8, wherein the producer determines the first timestamp based at least in part on a stored timestamp associated with the stream of time-associated data.

10. The system of claim 5, wherein the producer receives the stream of time-associated data in real-time from a source.

11. The system of claim 10, wherein the producer determines the first timestamp based at least in part on a current time.

12. The system of claim 5, wherein the producer stores the first fragment in a local cache until the third acknowledgment for the first fragment has been received.

13. The system of claim 5, wherein the first fragment is generated based at least in part on a predefined time length or a predefined size.

14. A method, comprising:
receiving, by at least one computing device, a first fragment of a stream of time-associated data via a network using an application-layer protocol from a producer, the first fragment being identified as having a first timestamp assigned by the producer;

assigning, by the at least one computing device, a first unique fragment identifier and a second timestamp to the first fragment; and sending, by the at least one computing device, a first acknowledgement, a second acknowledgement after sending the first acknowledgement, and a third acknowledgment after sending the second acknowledgement for the first fragment to the producer via the network using the application-layer protocol, the first acknowledgement indicating that an endpoint service has begun to receive data from the first fragment, the second acknowledgement indicating that the endpoint service has completed receiving the data from the first fragment, the third acknowledgment indicating that the endpoint service has completed storing the first fragment in a data store, wherein the first, second, and third acknowledgements identify the first fragment by the first timestamp.

15. The method of claim 14, further comprising:

receiving, by the at least one computing device, a first instance of a second fragment of the stream of time-associated data, the second fragment being identified as having a third timestamp assigned by the producer;

determining, by the at least one computing device, that the second fragment has an error;

sending, by the at least one computing device, a non-acknowledgement for the second fragment to the producer via the network using the application-layer protocol; and receiving, by the at least one computing device, a second instance of the second fragment of the stream of time-associated data from the producer, the second fragment being identified as having the third timestamp.

16. The method of claim 14, wherein the first fragment is generated based at least in part on a predefined time length.

17. The method of claim 14, wherein the producer stores the first fragment in a local cache until the third acknowledgment for the first fragment has been received.

18. The method of claim 14, wherein the producer receives the stream of time-associated data in real-time from a source.

19. The method of claim 14, wherein the producer determines the first timestamp based at least in part on a current time.

20. The method of claim 14, wherein the first fragment is generated based at least in part on a predefined size.

* * * * *